(12) United States Patent
Dohi

(10) Patent No.: US 10,890,743 B2
(45) Date of Patent: Jan. 12, 2021

(54) ILLUMINATION DEVICE AND MICROSCOPE DEVICE

(71) Applicant: OLYMPUS CORPORATION, Hachioji (JP)

(72) Inventor: Masahito Dohi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 50 days.

(21) Appl. No.: 15/868,615

(22) Filed: Jan. 11, 2018

(65) Prior Publication Data

US 2018/0224645 A1  Aug. 9, 2018

(30) Foreign Application Priority Data

Feb. 8, 2017  (JP) .................. 2017-021702

(51) Int. Cl.
  *G02B 21/06*  (2006.01)
  *G02B 21/00*  (2006.01)
  *G02B 21/02*  (2006.01)

(52) U.S. Cl.
  CPC ....... *G02B 21/0072* (2013.01); *G02B 21/006* (2013.01); *G02B 21/0032* (2013.01);
  (Continued)

(58) Field of Classification Search
  CPC .............. G02B 21/006; G02B 21/0072; G02B 21/0076; G02B 21/0032; G02B 21/0036; G02B 21/0056; G02B 21/0064; G02B 21/0044; G02B 21/0088; G02B 21/02; G02B 21/04; G02B 21/06; G02B 21/14; G02B 21/16; G02B 21/24; G02B 21/34; G02B 21/241; G02B 21/245; G02B 21/361; G02B 21/365; G02B 21/367; G02B 27/0037; G02B 27/0068; G02B 27/58; G02B 27/0025; G02B 27/141; G02B 27/283; G02B 17/008; G02B 23/04;
  (Continued)

(56) References Cited

U.S. PATENT DOCUMENTS

2010/0053735 A1 * 3/2010 Wilson ................. G02B 21/006
                                                          359/363
2012/0062986 A1   3/2012 Wilson et al.
(Continued)

FOREIGN PATENT DOCUMENTS

JP  2004317676 A  11/2004
JP  2005010516 A   1/2005
(Continued)

OTHER PUBLICATIONS

Japanese Office Action (and English language translation thereof) dated Dec. 1, 2020 issued in Japanese Application No. 2017-021702.

*Primary Examiner* — Mustak Choudhury
(74) *Attorney, Agent, or Firm* — Holtz, Holtz & Volek PC

(57) ABSTRACT

An illumination device includes: an objective; a first scanning device that moves a focusing position of light in an optical-axis direction of the objective; and a relay optical system that is configured to correct an aberration that is generated in the objective by the first scanning device moving the focusing position, the relay optical system being arranged on an optical path between the first scanning device and the objective.

19 Claims, 23 Drawing Sheets

(52) U.S. Cl.
CPC ......... *G02B 21/0076* (2013.01); *G02B 21/02* (2013.01); *G02B 21/0044* (2013.01); *G02B 21/0064* (2013.01)

(58) Field of Classification Search
CPC .............. G02B 21/0004; G02B 21/002; G02B 21/0024; G02B 21/0025; G02B 21/0031; G02B 21/0028; G02B 21/0096; G02B 21/025; G02B 21/18; G02B 21/41; G02B 21/4133; A61B 3/0025; A61B 3/14; A61B 3/102; A61B 3/1225
See application file for complete search history.

(56) References Cited

U.S. PATENT DOCUMENTS

2013/0215502 A1 8/2013 Wilson et al.
2016/0327779 A1* 11/2016 Hillman ............... G02B 21/367

FOREIGN PATENT DOCUMENTS

| | | |
|---|---|---|
| JP | 2010286799 A | 12/2010 |
| JP | 5677473 B2 | 2/2015 |
| KR | 20100125014 A | 11/2010 |

* cited by examiner

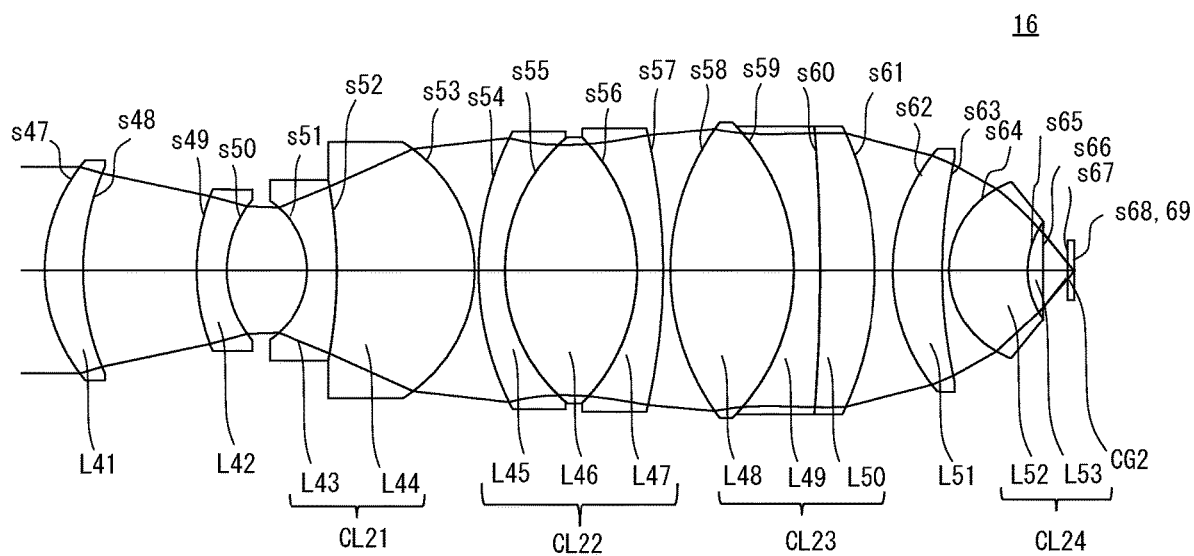
F I G. 6

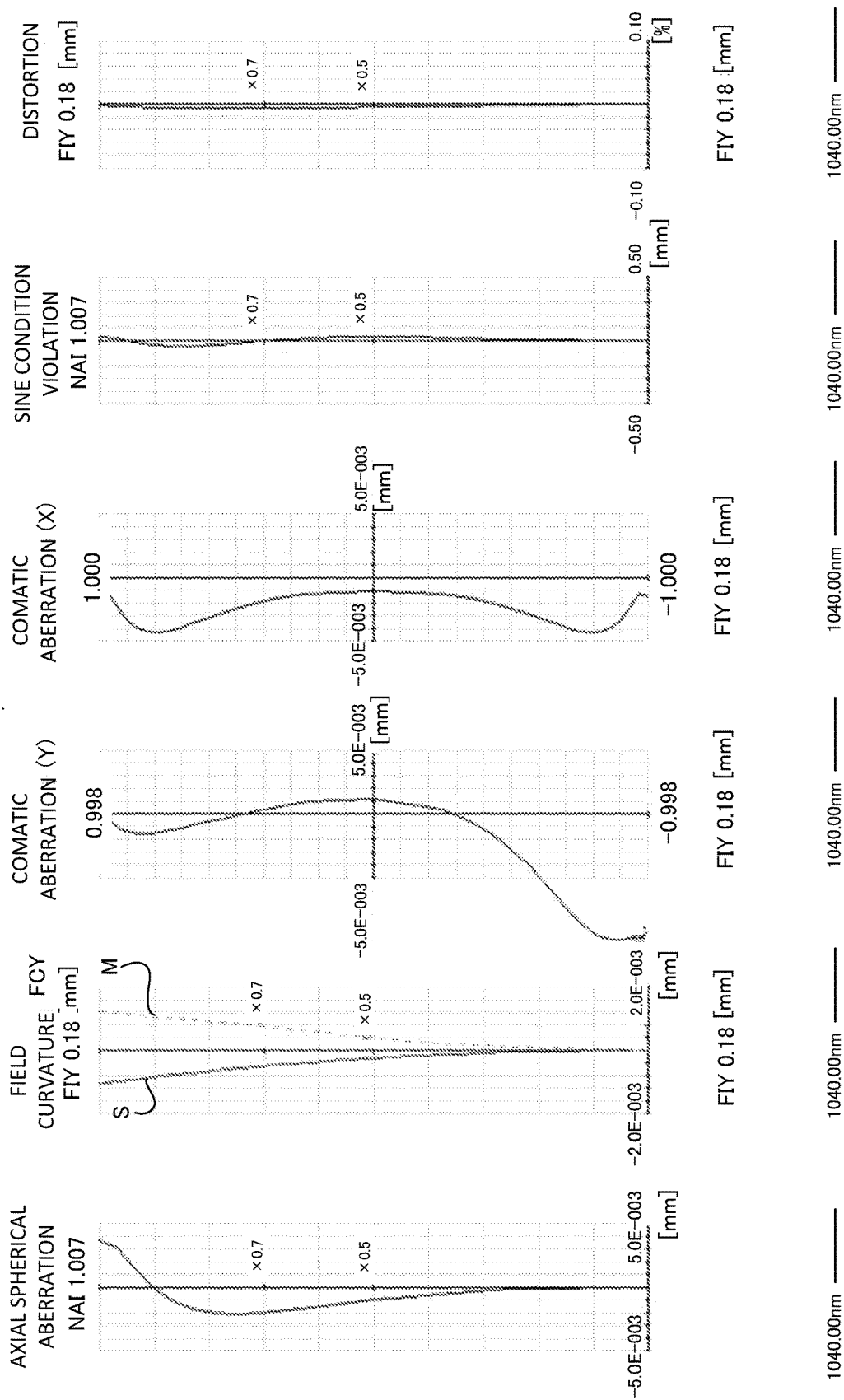

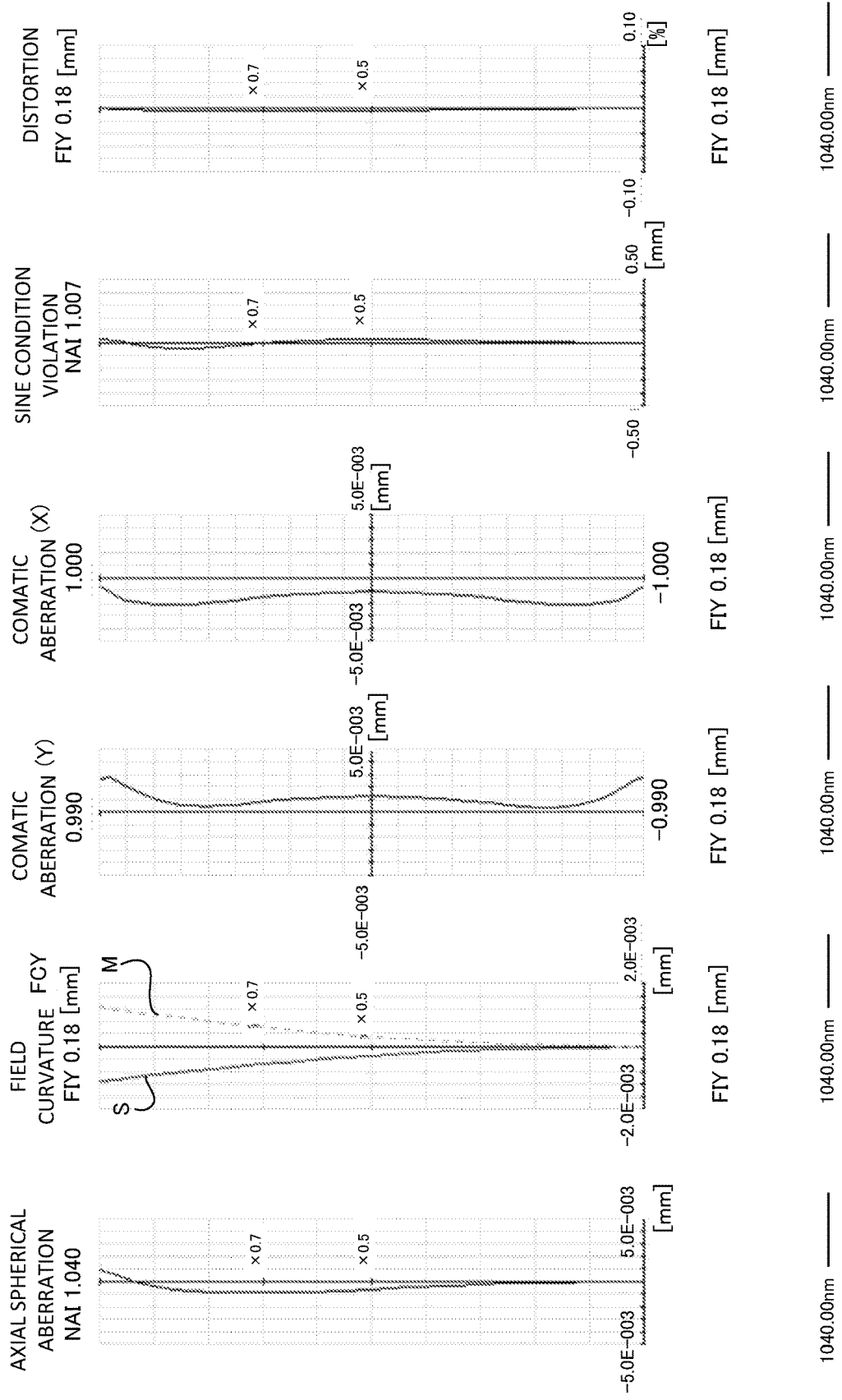

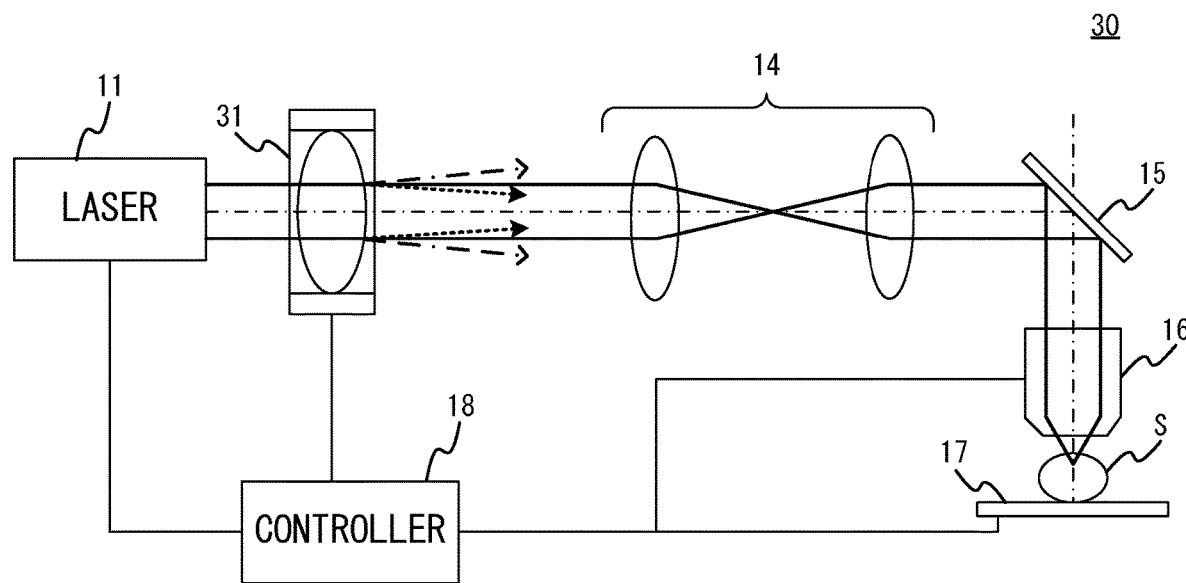
F I G. 16

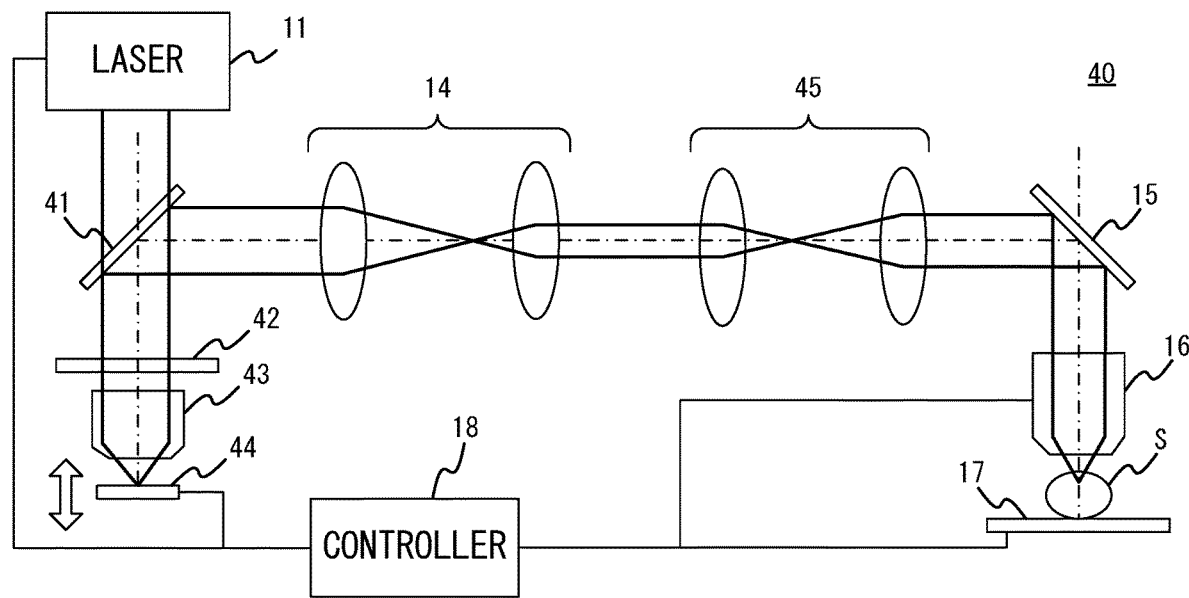
F I G. 17

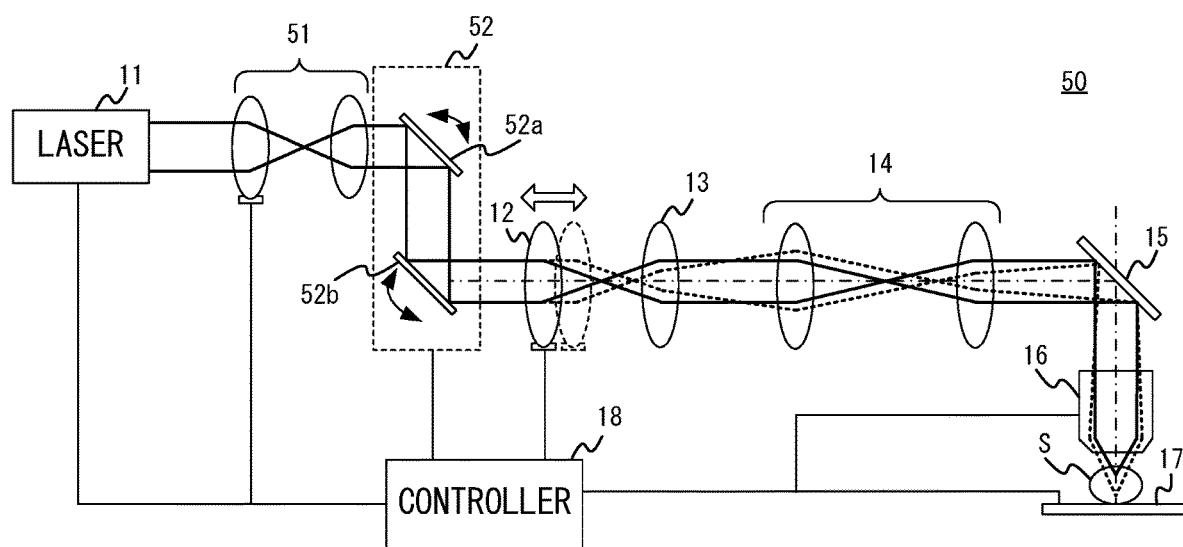
F I G. 18

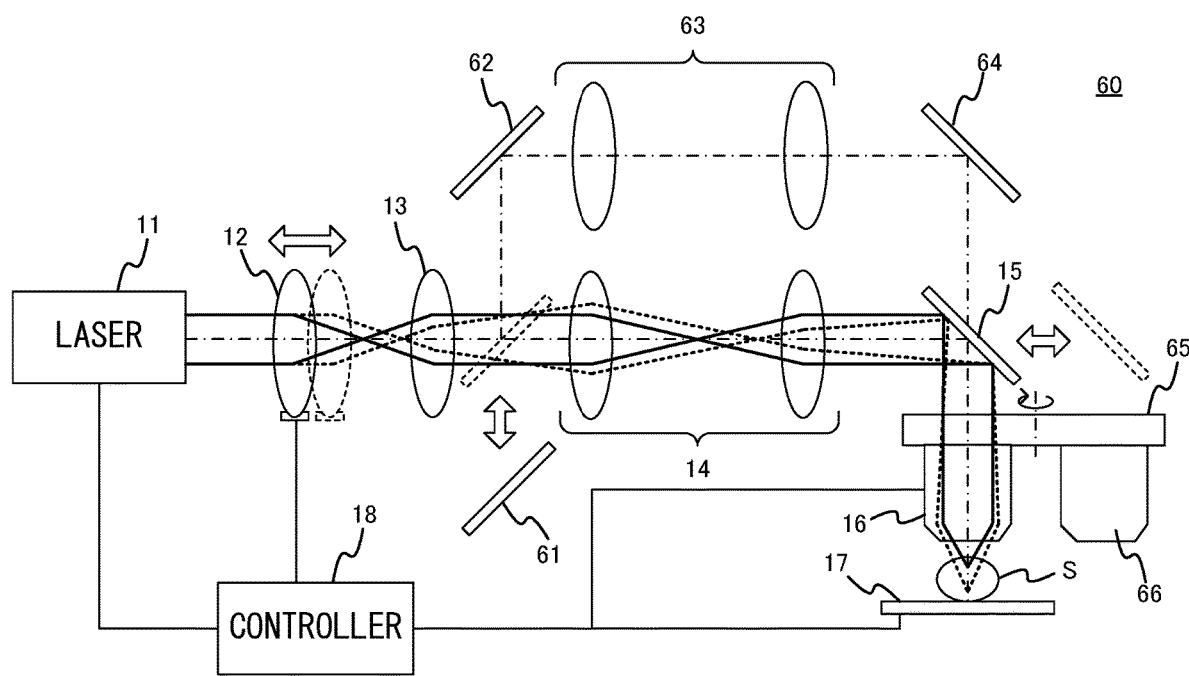
F I G. 19

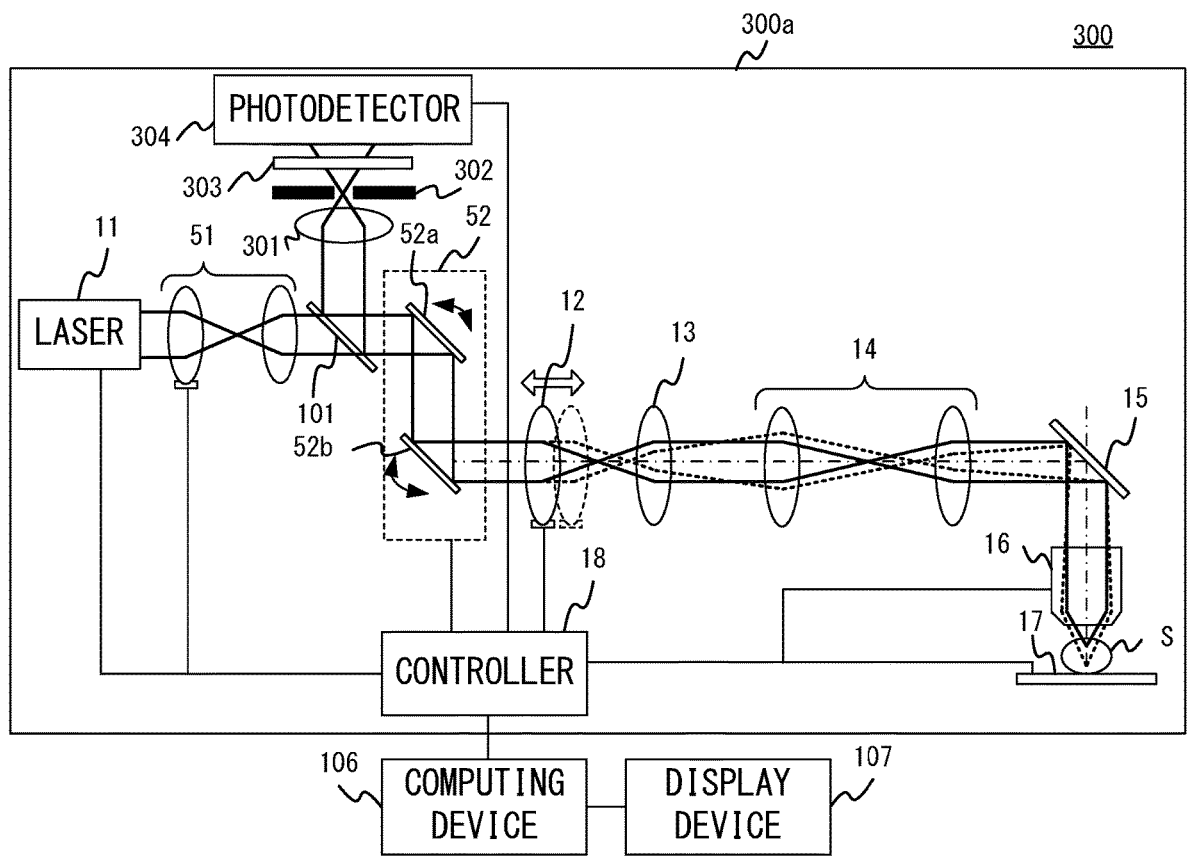
F I G. 2 2

ILLUMINATION DEVICE AND MICROSCOPE DEVICE

CROSS REFERENCE TO RELATED APPLICATIONS

This application is based upon and claims the benefit of priority from the prior Japanese Patent Application No. 2017-021702, filed on Feb. 8, 2017, the entire contents of which are incorporated herein by this reference.

BACKGROUND OF THE INVENTION

Field of the Invention

The disclosure herein is related to an illumination device and a microscope device.

Description of the Related Art

In recent years, research has been actively conducted to observe biological tissues of living small animals with a two-photon microscope and to elucidate the functions of the living biotissue. A biotissue has a stereoscopic structure, and therefore a three-dimensional imaging technology is used to observe biotissues.

As the three-dimensional imaging technology, a method for constructing a three-dimensional image by moving an objective or a specimen in an optical-axis direction of the objective and sequentially imaging a plurality of planes that are different from each other in the optical-axis direction is common. This method has an advantage of being very simple and an advantage wherein optical performance is not likely to deteriorate. However, it has been pointed out that this method has a problem wherein vibration is generated due to movement, a problem wherein it takes time to move, and other problems. In particular, an objective that enables a specimen to be observed with brightness and a high resolving power is relatively large in size and heavy, and therefore the problems above may arise remarkably.

A technology relating to the problems above is described in the specification of Japanese Patent No. 5677473. In the specification of Japanese Patent No. 5677473, a focus adjustment device is described that includes a pair of high-numerical-aperture lenses and a mirror that is arranged near a focal plane of one of the pair of high-numerical-aperture lenses. In addition, an inner focus method is described in which, in the focus adjustment device, a focus is moved at high speed while suppressing a vibration to a specimen by moving the mirror at high speed.

SUMMARY OF THE INVENTION

An illumination device in one aspect of the present invention includes: an objective that applies light from a light source to a sample; a first scanning device that moves a focusing position of the light that the objective applies to the sample in an optical-axis direction of the objective; and a relay optical system that is configured to correct an aberration that is generated in the objective by the first scanning device moving the focusing position, the relay optical system being arranged on an optical path between the first scanning device and the objective.

A microscope device in one aspect of the present invention includes an illumination device. The illumination device includes: an objective that applies light from a light source to a sample; a first scanning device that moves a focusing position of the light that the objective applies to the sample in an optical-axis direction of the objective; and a relay optical system that is configured to correct an aberration that is generated in the objective by the first scanning device moving the focusing position, the relay optical system being arranged on an optical path between the first scanning device and the objective.

BRIEF DESCRIPTION OF THE DRAWINGS

The present invention will be more apparent from the following detailed description when the accompanying drawings are referenced.

FIG. 6 is a sectional view of an objective 16.

FIG. 13A to FIG. 13F are aberration diagrams of the optical system 20a at the time when light is collected at a position of −0.3 mm from a design position.

FIG. 14A to FIG. 14F are aberration diagrams of the optical system 20a at the time when light is collected at a design position.

FIG. 16 illustrates the configuration of an illumination device 30 according to a third embodiment.

FIG. 17 illustrates the configuration of an illumination device 40 according to a fourth embodiment.

FIG. 18 illustrates the configuration of an illumination device 50 according to a fifth embodiment.

FIG. 19 illustrates the configuration of an illumination device 60 according to a sixth embodiment.

FIG. 22 illustrates the configuration of a laser scanning confocal microscope 300 according to a ninth embodiment.

DESCRIPTION OF THE EMBODIMENTS

In general, in the inner focus method, the state of a light flux that enters an objective depends on a focal position. Therefore, in an objective that has been designed under the assumption that parallel light will enter, in some cases, a spherical aberration is generated, and optical performance deteriorates.

In the focus adjustment device described in the specification of Japanese Patent No. 5677473, a pair of high-numerical-aperture lenses are used such that a spherical aberration generated by one of the pair of high-numerical-aperture lenses that corresponds to an objective can be reduced using the other high-numerical-aperture lens. However, in practice, an in-focus range in which a spherical aberration can be corrected to an allowable level in observation is narrow, and therefore it is difficult to employ this focus adjustment device in the observation of relatively large biotissues.

Embodiments of the present invention are described below.

First Embodiment

Figure 1:
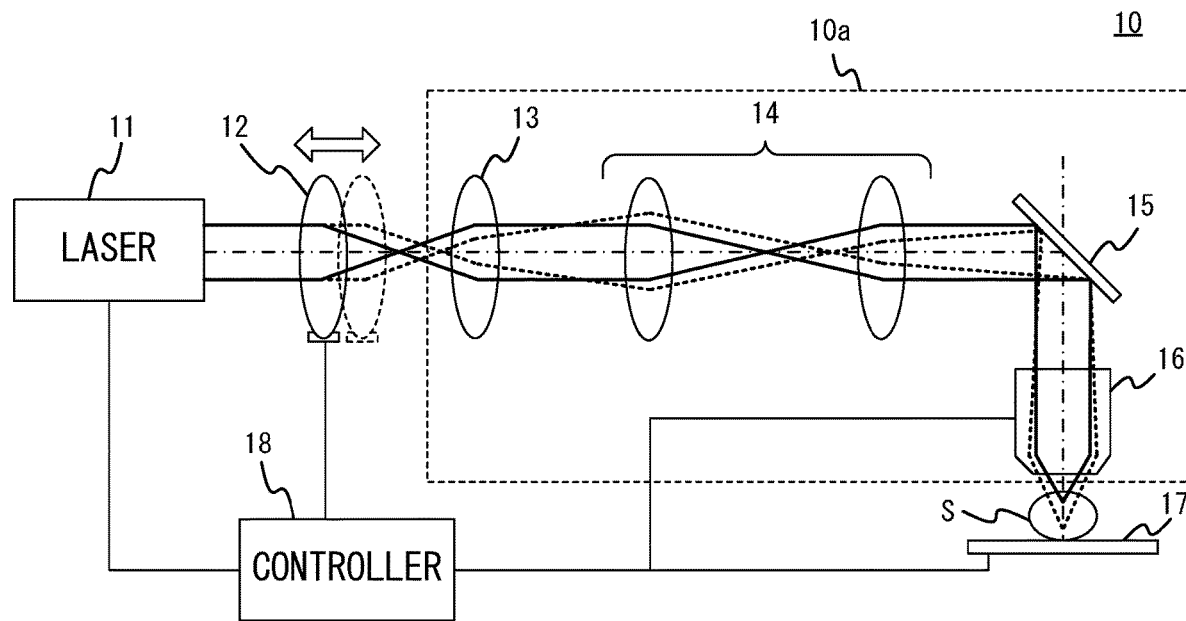
FIG. 1 illustrates the configuration of an illumination device 10 according to a first embodiment.

FIG. 1 illustrates the configuration of an illumination device 10 according to this embodiment. The illumination device 10 is a device that collects a laser beam at a single point on a sample S, and is used in a microscope device and the like. The sample S is, for example, a biological specimen when the illumination device 10 is used in a biological microscope device. The sample S is, for example, a circuit board when the illumination device 10 is used in an industrial microscope device. The description below is given taking, as an example, a case in which the sample S is a biological specimen.

The illumination device 10 includes a laser 11 that emits a laser beam, an objective 16 that irradiates the sample S with the laser beam from the laser 11, and a controller 18 that controls the operation of the illumination device 10. The laser 11 is a light source that emits light having an excitation wavelength that excites the sample S. When the illumination device 10 is used in a two-photon excitation microscope, the laser 11 is, for example, an ultra-short pulse laser that emits a laser beam in an infrared wavelength region. When the illumination device 10 is used in a confocal microscope, the laser 11 emits, for example, a laser beam in an ultraviolet wavelength region or a visible wavelength region. The objective 16 is, for example, an infinity-corrected microscope objective.

The illumination device 10 further includes a scanning device 12, a lens 13, a relay optical system 14 that relays the pupil of the objective 16, and a mirror 15 on an optical path between the laser 11 and the objective 16. The laser beam from the laser 11 is first collected between the scanning device 12 and the lens 13 by the scanning device 12, and enters the mirror 15 via the lens 13 and the relay optical system 14. The laser beam reflected by the mirror 15 is collected at a single point on the sample S due to the refractive power of the objective 16. Herein, a focusing position, which is a position at which a laser beam is collected, is also referred to as a focal position.

The scanning device 12 is a device that moves the focusing position of the laser beam that the objective 16 applies to the sample S in an optical-axis direction of the objective 16. The scanning device 12 includes a collecting lens that is arranged so as to move in the optical-axis direction. The scanning device 12 can move the focusing position of the laser beam in the optical-axis direction of the objective 16 according to the inner focus method by moving the collecting lens in the optical-axis direction according to a control signal from the controller 18. FIG. 1 illustrates two light fluxes (a solid line and a broken line) that are collected at positions different from each other.

The lens 13 and the relay optical system 14 are arranged on an optical path between the scanning device 12 and the objective 16. The relay optical system 14 is configured to correct an aberration that is generated in the objective 16 by the scanning device 12 moving the focusing position. Specifically, the relay optical system 14 generates an aberration in a direction opposite to the direction of an aberration that is generated in the objective 16 in accordance with the focusing position in such a way that the aberration generated in the objective 16 is corrected on the sample S. In addition, the relay optical system 14 changes an aberration to be generated in accordance with the focusing position by using the fact that the diameters of light fluxes at the time when a light flux passes through respective lenses configuring the relay optical system 14 are different from each other according to the focusing position. Stated another way, in the illumination device 10, the relay optical system 14 and the objective 16 are configured to correct an aberration that is generated when the focusing position is moved in the optical-axis direction by the scanning device 12 according to a compensation method.

The "aberration that is generated in the objective 16 by the scanning device 12 moving the focusing position in the optical-axis direction" refers to an aberration that cannot be corrected by the objective 16 when light that is not parallel light enters. The objective 16 is normally designed for an aberration under the assumption that parallel light enters, and the objective 16 is designed in such a way that an aberration can be satisfactorily corrected when parallel light enters. When light that is not parallel light enters, an aberration fails to be satisfactorily corrected by the objective 16 alone, and an aberration according to a state (for example, a level of convergence or divergence) of incident light is generated in the objective 16.

In the illumination device 10 configured as described above, even when a focus (namely, a focusing position) is moved according to the inner focus method, an aberration generated by the objective 16 due to the movement of a focus can be corrected by the relay optical system 14. Therefore, optical performance deterioration can be suppressed due to the movement of a focus according to the inner focus method. In addition, the relay optical system 14 and the objective 16 are configured to correct an aberration according to the compensation method. Therefore, an aberration that changes according to the focusing position can be corrected without a physical movement of a structure (such as a correction collar). Thus, even when a focus is moved at high speed according to the inner focus method, an aberration can be corrected without delay with respect to the movement of a focus. Accordingly, by employing the illumination device 10, a focus can be moved at high speed according to the inner focus method while suppressing optical performance deterioration.

An example in which the operation of the scanning device 12 is controlled by the controller 18 has been described above, but the controller 18 may control the operations of the laser 11, the objective 16, and a stage 17. As an example, the controller 18 may control the emission of a laser beam. When the laser 11 is a laser unit that includes a plurality of lasers that have different laser wavelengths and a device, such as an acousto-optic tunable filter (AOTF), that selects a wavelength, the controller 18 may control the switching of a laser wavelength in addition to the control of the emission of a laser beam. When the laser wavelength is switched, the focusing position moves in the optical-axis direction due to an influence of an axial chromatic aberration. Therefore, when the switching of the laser wavelength is controlled, the controller 18 may move the objective 16 or the stage 17 in the optical-axis direction in such a way that an amount of the movement of the focusing position due to the axial chromatic aberration is canceled. Namely, in the illumination device 10, the objective 16 and the stage 17 that move in the optical-axis direction may function as an offset device that offsets the movement of the focusing position due to the switching of the wavelength of light. The controller 18 may control the offset device according to the wavelength of light. The controller 18 may control the operation of the scanning device 12 in consideration of an amount of the movement of the focusing position due to the axial chromatic aberration. In this case, the scanning device 12 functions as an offset device.

Figure 2:
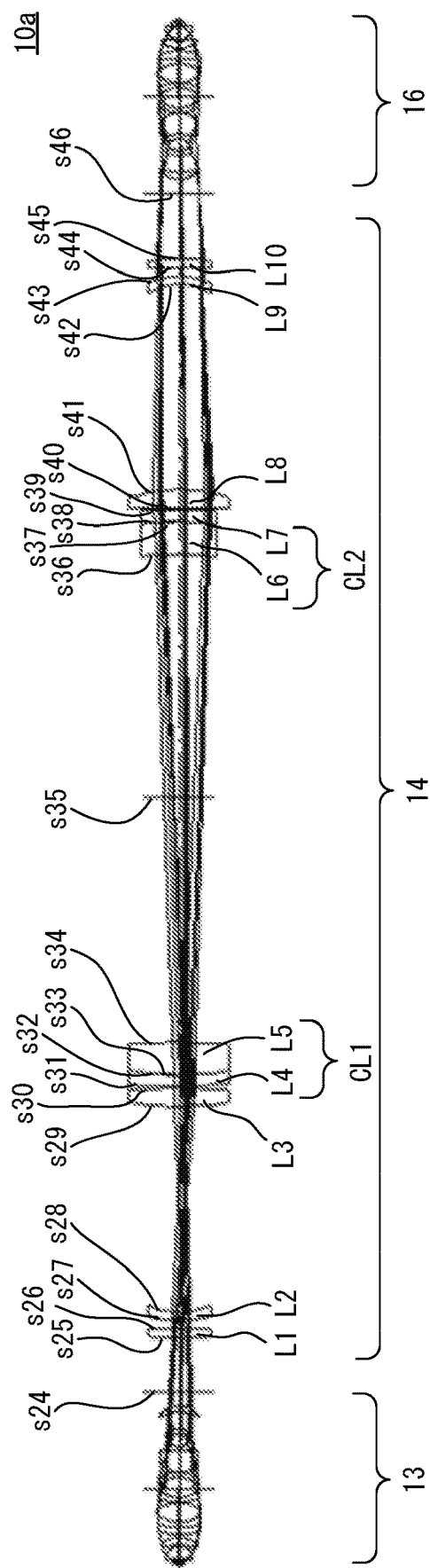
FIG. 2 is a sectional view of an optical system 10a illustrating a ray of light at the time when light is collected at a position of −0.3 mm from a design position.
Figure 3:
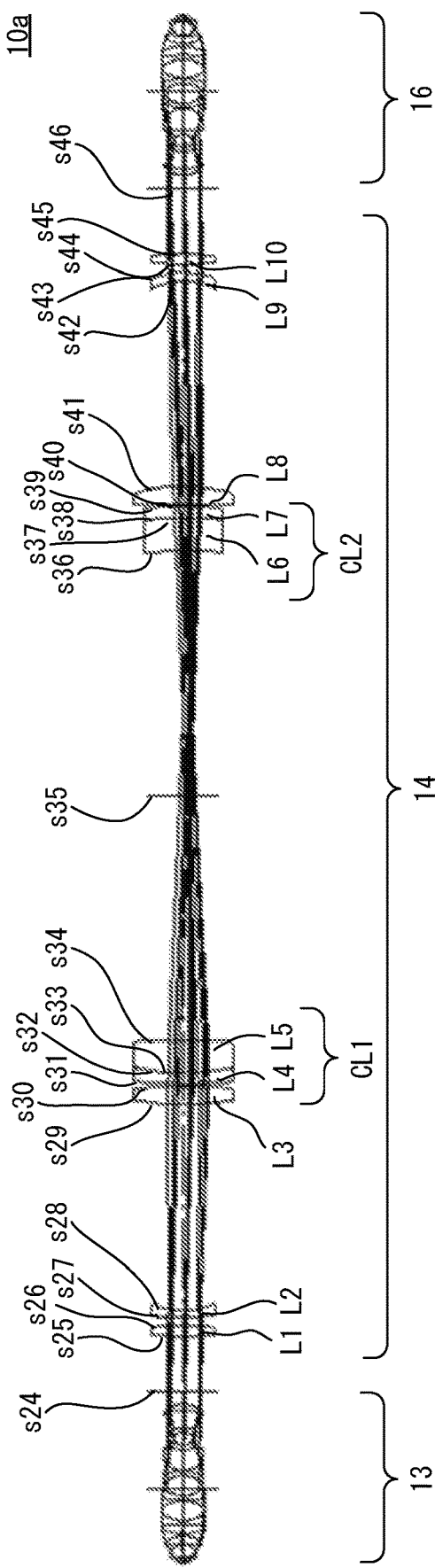
FIG. 3 is a sectional view of the optical system 10a illustrating a ray of light at the time when light is collected at a design position.
Figure 4:
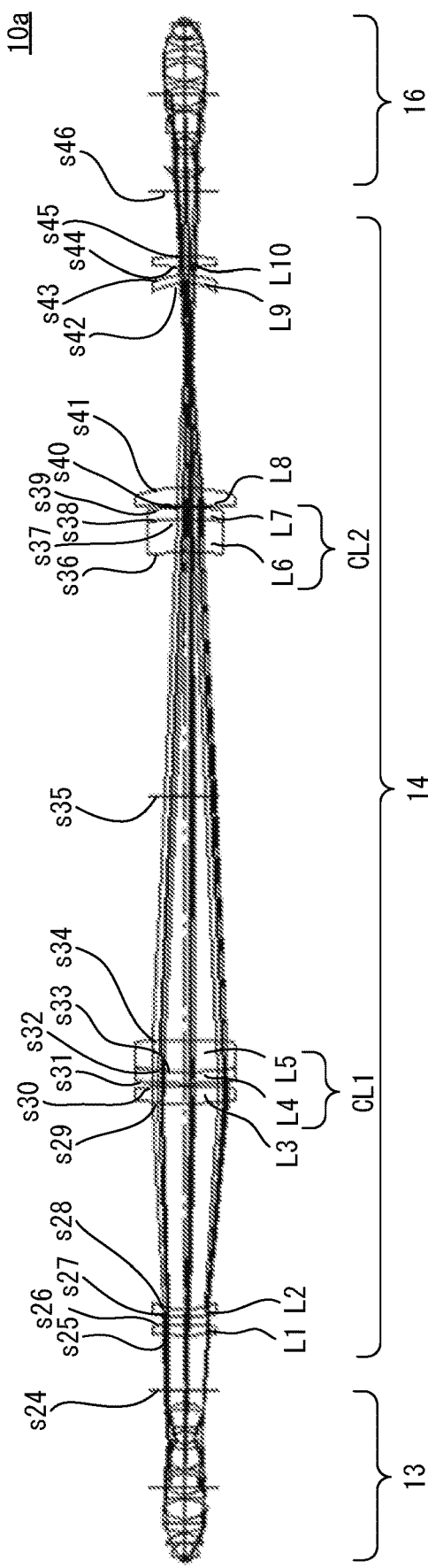
FIG. 4 is a sectional view of the optical system 10a illustrating a ray of light at the time when light is collected at a position of 0.3 mm from a design position.

FIG. 2 to FIG. 4 are sectional views of an optical system 10a that is configured by the lens 13, the relay optical system 14, and the objective 16 in the illumination device 10. FIG. 2, FIG. 3, and FIG. 4 respectively illustrate rays of light at the time when light is collected at a position of −0.3 mm in the optical-axis direction from a design position, at the design position, and at a position of 0.3 mm in the optical-axis direction from the design position. The design position refers to a focusing position at the time when parallel light enters the objective 16. The respective drawings also illustrate rays of light of three light fluxes that are collected on the axis, at the most out-of-axis position, and at an immediate image height position (an image height ratio of 0.5).

The relay optical system 14 includes, in order from a side of the laser 11, a biconvex lens L1, a meniscus lens L2 with a concave surface facing a side of the objective 16, a biconvex lens L3, a cemented lens CL1, a cemented lens CL2, a biconvex lens L8, a meniscus lens L9 with a concave surface facing the side of the laser 11, and a biconvex lens L10, as illustrated in FIG. 2 to FIG. 4. The cemented lens CL1 is configured by a meniscus lens L4 with a concave surface facing the side of the objective 16 and a biconvex lens L5. The cemented lens CL1 is a two-lens cemented lens that attains an overall biconvex shape by filling a gap between the meniscus lens L4 and the biconvex lens L5 with an adhesive. The cemented lens CL2 is configured by a meniscus lens L6 with a concave surface facing the side of the laser 11 and a meniscus lens L7 with a concave surface facing the side of the laser 11. The cemented lens CL2 is a two-lens cemented lens that has attains an overall meniscus shape with a concave surface facing the side of the laser 11 by filling a gap between the meniscus lens L6 and the meniscus lens L7 with an adhesive.

As illustrated in FIG. 2, FIG. 3, and FIG. 4, a diameter of a light flux at each of the lenses at the time when the light flux passes through the relay optical system 14 changes due to the movement of a focus. As an example, when the focusing position is located in a minus direction from the design position, the diameter of the light flux increases in a region that is close to the objective 16 within the relay optical system 14, as illustrated in FIG. 2. Therefore, in particular, the design of the cemented lens CL2, the lens L8 to the lens L10, and the like significantly affects aberration correction performance. When the focusing position is located in a plus direction from the design position, the diameter of the light flux increases in a region that is close to the lens 13 within the relay optical system 14, as illustrated in FIG. 4. Therefore, in particular, the design of the lens L1 to the lens L3, the cemented lens CL1, and the like significantly affects aberration correction performance.

Figure 5:
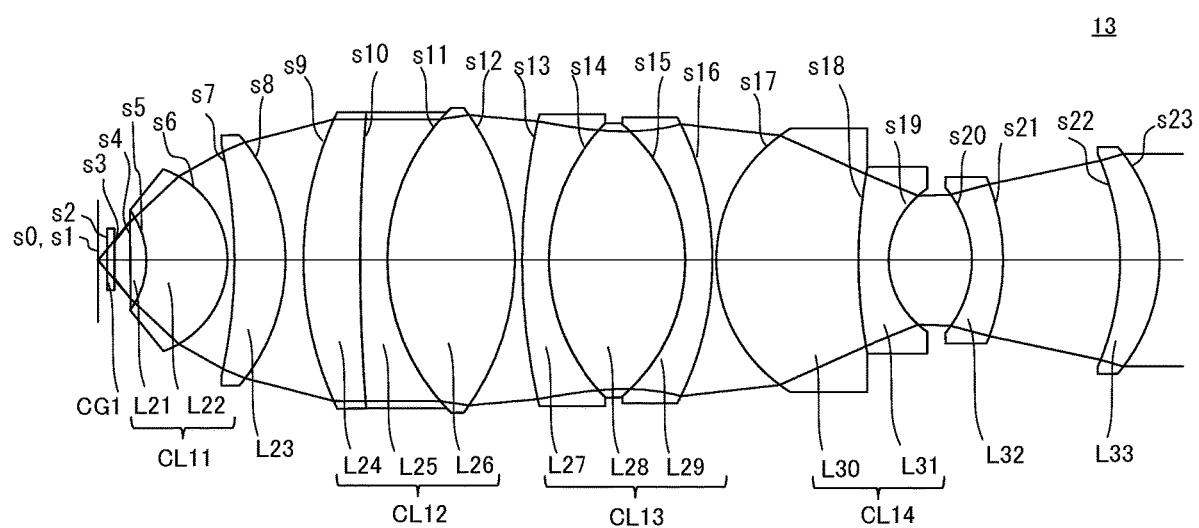
FIG. 5 is a sectional view of a lens 13.

FIG. 5 is a sectional view of the lens 13. The lens 13 includes, in order from the side of the laser 11, a two-lens cemented lens CL11, a meniscus lens L23 with a concave surface facing the side of the laser 11, a three-lens cemented lens CL12, a three-lens cemented lens CL13, a two-lens cemented lens CL14, a meniscus lens L32 with a concave surface facing the side of the laser 11, and a meniscus lens L33 with a concave surface facing the side of the laser 11, as illustrated in FIG. 5. The two-lens cemented lens CL11 is configured by a plano-convex lens L21 with a plane surface facing the side of the laser 11 and a meniscus lens L22 with a concave surface facing the side of the laser 11. The three-lens cemented lens CL12 is configured by a meniscus lens L24 with a concave surface facing the side of the objective 16, a meniscus lens L25 with a concave surface facing the side of the objective 16, and a biconvex lens L26. The three-lens cemented lens CL13 is configured by a meniscus lens L27 with a concave surface facing the side of the objective 16, a biconvex lens L28, and a meniscus lens L29 with a concave surface facing the side of the laser 11. The two-lens cemented lens CL14 is configured by a meniscus lens L30 with a concave surface facing the side of the objective 16 and a meniscus lens L31 with a concave surface facing the side of the objective 16.

FIG. 6 is a sectional view of the objective 16. The objective 16 has attains a magnification of 25X by being combined with a tube lens having a focal length of 180 mm. The objective 16 includes, in order from the side of the laser 11, a meniscus lens L41 with a concave surface facing a side of the sample S, a meniscus lens L42 with a concave surface facing the side of the sample S, a two-lens cemented lens CL21, a three-lens cemented lens CL22, a three-lens cemented lens CL23, a meniscus lens L51 with a concave surface facing the side of the sample S, and a two-lens cemented lens CL24, as illustrated in FIG. 6. The two-lens cemented lens CL21 is configured by a meniscus lens L43 with a concave surface facing the side of the laser 11 and a meniscus lens L44 with a concave surface facing the side of the laser 11. The three-lens cemented lens CL22 is configured by a meniscus lens L45 with a concave surface facing the side of the sample S, a biconvex lens L46, and a meniscus lens L47 with a concave surface facing the side of the laser 11. The three-lens cemented lens CL23 is configured by a biconvex lens L48, a meniscus lens L49 with a concave surface facing the side of the laser 11, and a meniscus lens L50 with a convex surface facing the side of the laser 11. The two-lens cemented lens CL24 is configured by a meniscus lens L52 with a concave surface facing the side of the sample S and a plano-convex lens L53 with a plane surface facing the side of the sample S. The lens 13 and the objective 16 are the same optical systems arranged so as to face directions opposite to each other, and have the same lens configuration.

The lens data of the optical system 10a is described below. In the lens data, INF indicates infinity (∞). The lens data below indicates an example in which a cover glass CG1 is arranged on the side of the laser 11 of the lens 13, a cover glass CG2 is arranged on the side of the sample S of the objective 16, and portions before and after the cover glass CG1 and the cover glass CG2 are filled with a medium other than air.

| Optical system 10a | | | | |
|---|---|---|---|---|
| s | r | d | n1040 | vd |
| 1 | INF | D1 | 1.34855 | 57.71 |
| 2 | INF | 0.1700 | 1.51226 | 54.41 |
| 3 | INF | 1.7293 | 1.32576 | 55.60 |
| 4 | INF | 1.1500 | 1.44999 | 67.83 |
| 5 | −5.9903 | 5.7088 | 1.75484 | 49.60 |
| 6 | −6.8605 | 0.4770 | | |
| 7 | −36.5263 | 3.6000 | 1.56010 | 71.30 |
| 8 | −13.6341 | 1.1825 | | |
| 9 | 24.2042 | 4.0000 | 1.48987 | 81.14 |
| 10 | 126.6562 | 1.9000 | 1.65413 | 38.15 |
| 11 | 15.1716 | 9.0000 | 1.43328 | 94.93 |
| 12 | −17.8940 | 0.5919 | | |
| 13 | 43.9925 | 1.9000 | 1.65413 | 38.15 |
| 14 | 13.7154 | 9.6635 | 1.43327 | 94.97 |
| 15 | −12.6287 | 1.9000 | 1.72470 | 52.64 |
| 16 | −21.8800 | 0.2700 | | |
| 17 | 10.9415 | 10.0246 | 1.48987 | 81.14 |
| 18 | 35.2043 | 2.1621 | 1.72470 | 52.64 |
| 19 | 6.0773 | 5.7728 | | |
| 20 | −8.0008 | 2.2000 | 1.59791 | 44.27 |
| 21 | −15.3052 | 8.2967 | | |
| 22 | −18.6412 | 2.8000 | 1.65413 | 38.15 |
| 23 | −12.2826 | 6.3468 | | |
| 24 | INF | 25.7068 | | |
| 25 | 110.6634 | 4.7700 | 1.47883 | 70.23 |
| 26 | −247.3168 | 3.8700 | | |
| 27 | 73.6740 | 3.6000 | 1.47883 | 70.23 |
| 28 | 34.7035 | 96.8048 | | |
| 29 | 140.8427 | 8.7000 | 1.43328 | 94.93 |
| 30 | −262.0466 | 0.7500 | | |
| 31 | 240.2306 | 5.5500 | 1.72470 | 52.64 |
| 32 | 140.8523 | 0.0360 | 1.55050 | 43.79 |
| 33 | 140.8523 | 15.1200 | 1.43328 | 94.93 |
| 34 | −425.0160 | 114.9186 | | |
| 35 | INF | 114.9186 | | |
| 36 | −181.4461 | 15.1200 | 1.43328 | 94.93 |
| 37 | −165.2374 | 0.0360 | 1.55050 | 43.79 |
| 38 | −165.2374 | 5.5500 | 1.72470 | 52.64 |
| 39 | −262.0968 | 0.7500 | | |
| 40 | 1074.0239 | 8.7000 | 1.43328 | 94.93 |
| 41 | −79.7588 | 96.8048 | | |
| 42 | −29.2600 | 3.6000 | 1.47883 | 70.23 |
| 43 | −42.7144 | 3.8700 | | |
| 44 | 213.2307 | 4.7700 | 1.47883 | 70.23 |
| 45 | −100.7479 | 30.8636 | | |
| 46 | INF | 6.3468 | | |
| 47 | 12.2826 | 2.8000 | 1.65413 | 38.15 |
| 48 | 18.6412 | 8.2967 | | |
| 49 | 15.3052 | 2.2000 | 1.59791 | 44.27 |
| 50 | 8.0008 | 5.7728 | | |
| 51 | −6.0773 | 2.1621 | 1.72470 | 52.64 |
| 52 | −35.2043 | 10.0246 | 1.48987 | 81.14 |
| 53 | −10.9415 | 0.2700 | | |
| 54 | 21.8800 | 1.9000 | 1.72470 | 52.64 |
| 55 | 12.6287 | 9.6635 | 1.43327 | 94.97 |
| 56 | −13.7154 | 1.9000 | 1.65413 | 38.15 |
| 57 | −43.9925 | 0.5919 | | |
| 58 | 17.8940 | 9.0000 | 1.43328 | 94.93 |
| 59 | −15.1716 | 1.9000 | 1.65413 | 38.15 |
| 60 | −126.6562 | 4.0000 | 1.48987 | 81.14 |
| 61 | −24.2042 | 1.1825 | | |
| 62 | 13.6341 | 3.6000 | 1.56010 | 71.30 |
| 63 | 36.5263 | 0.4770 | | |
| 64 | 6.8605 | 5.7088 | 1.75484 | 49.60 |
| 65 | 5.9903 | 1.1500 | 1.44999 | 67.83 |
| 66 | INF | 1.7293 | 1.32576 | 55.60 |
| 67 | INF | 0.1700 | 1.51226 | 54.41 |
| 68 | INF | D68 | 1.34855 | 57.71 |
| 69 | INF | 0 | 1.34855 | 57.71 |

In this lens data, s indicates a surface number, r indicates a radius of curvature (mm), d indicates a spacing between surfaces (mm), n1040 indicates a refractive index with respect to light having a designed wavelength (1040 nm), and vd indicates an Abbe number. These symbols are similar in the embodiments described below. The surface number s1 indicates a focusing position between the scanning device 12 and the lens 13. The surface numbers s2 and s3 respectively indicate a surface on the side of the laser 11 and a surface on the side of the lens 13 of the cover glass CG1. The surface numbers s4 and s66 respectively indicate a lens surface closest to the laser 11 of the lens 13 and a lens surface closest to the sample S of the objective 16. The surface number s67 indicates a surface on the side of the laser 11 of the cover glass CG2. The surface number s68 indicates a surface on the side of the Sample S of the cover glass CG2. The surface number s69 indicates the focusing position. The design position is a position of 0.3 mm from the surface number s68.

D1 and D68 are values of the spacing d1 and the spacing d68, and change according to the movement of a focus. The values of D1 and D68 in the state (Zoom1) illustrated in FIG. 2 in which the focusing position is located at a position of −0.3 mm from the design position, in the state (Zoom2) illustrated in FIG. 3 in which the focusing position is located at the design position, and in the state (Zoom3) illustrated in FIG. 4 in which the focusing position is located at a position of 0.3 mm from the design position are described below.

| | Zoom1 | Zoom2 | Zoom3 |
|---|---|---|---|
| D1 | 0.58248 | 0.30000 | −0.03317 |
| D68 | 0.0 | 0.30000 | 0.60000 |

Figure 7:
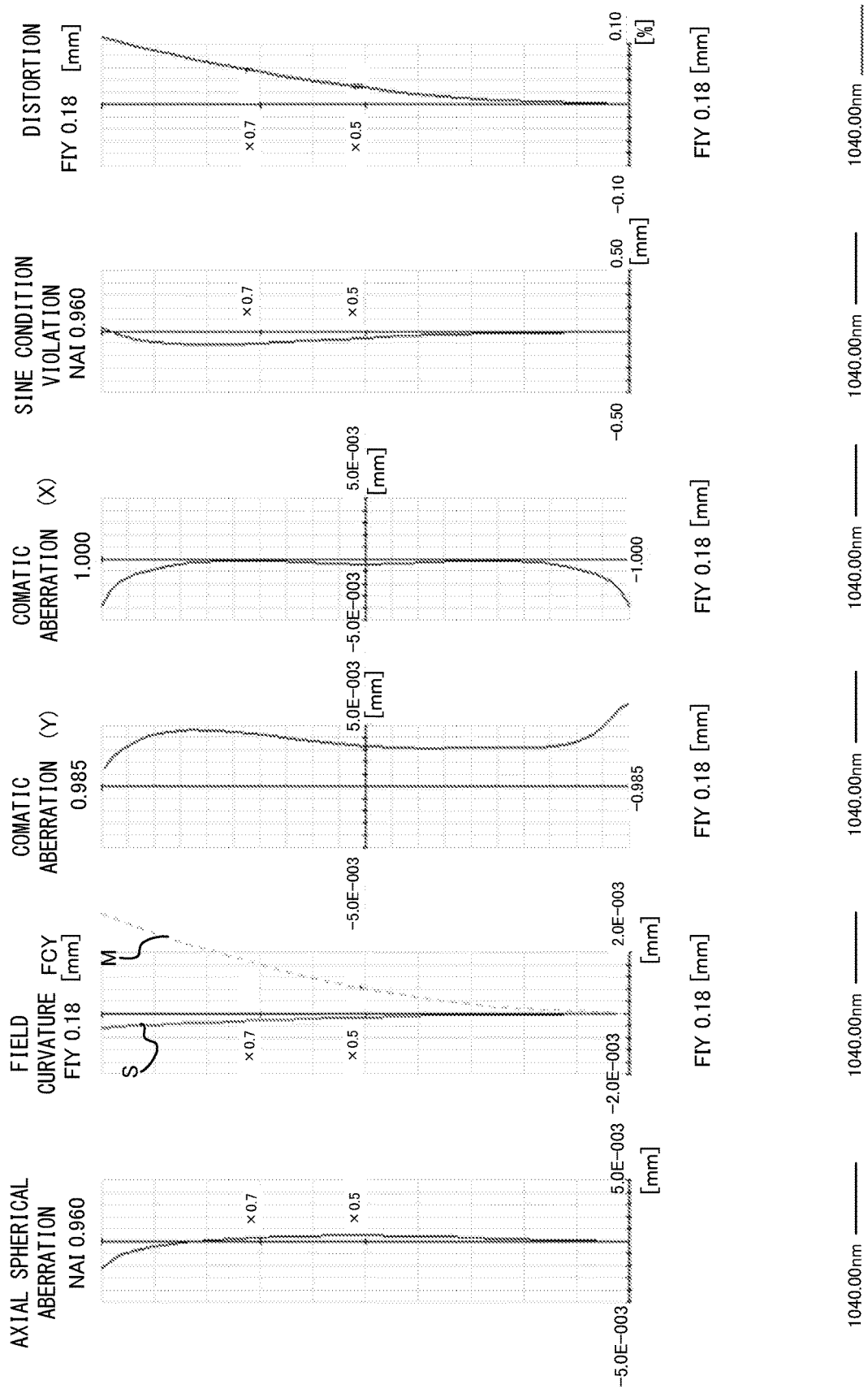
FIG. 7A to FIG. 7F are aberration diagrams of the optical system 10a at the time when light is collected at a position of −0.3 mm from a design position.
Figure 8:
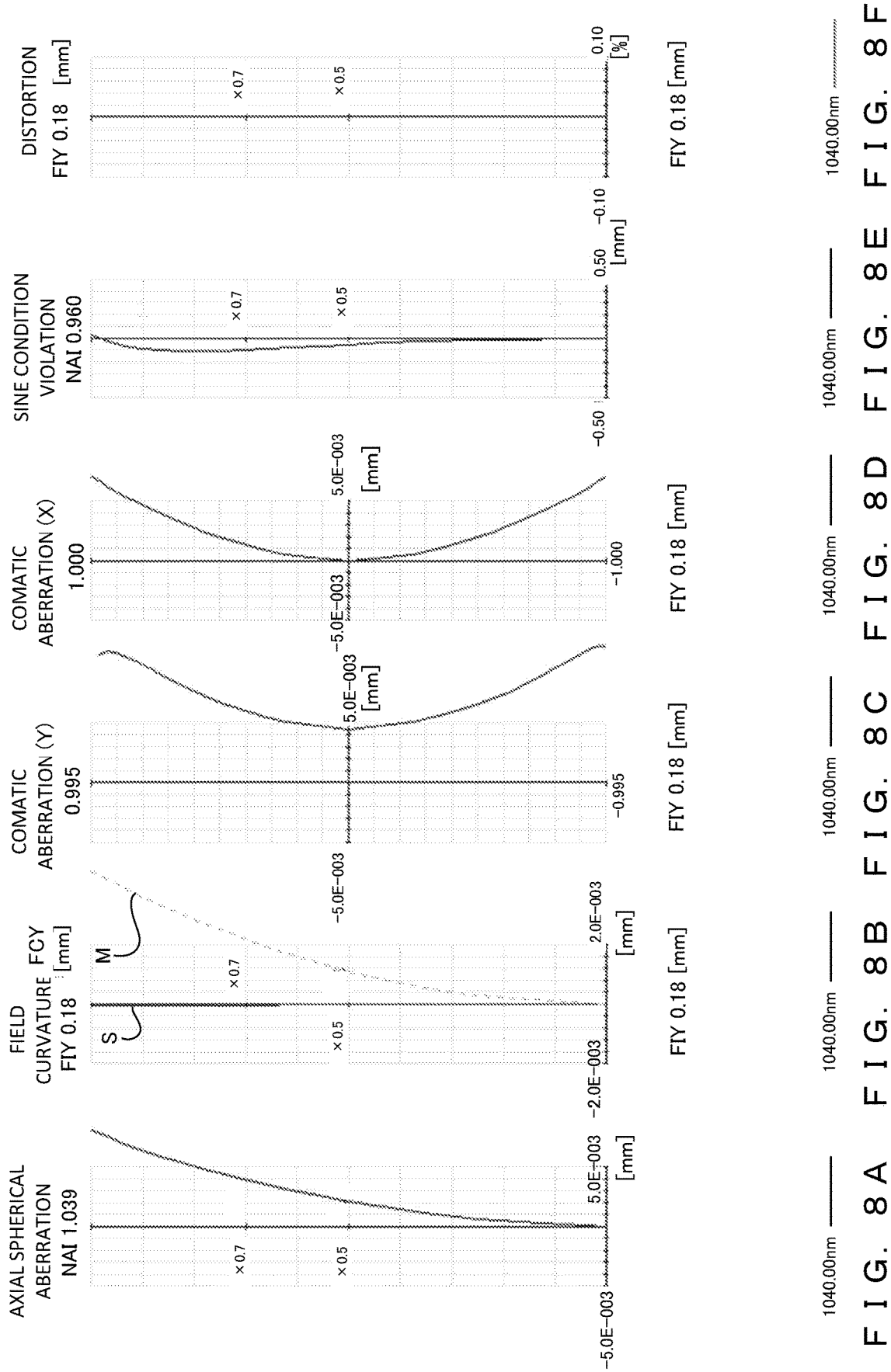
FIG. 8A to FIG. 8F are aberration diagrams of the optical system 10a at the time when light is collected at a design position.
Figure 9:
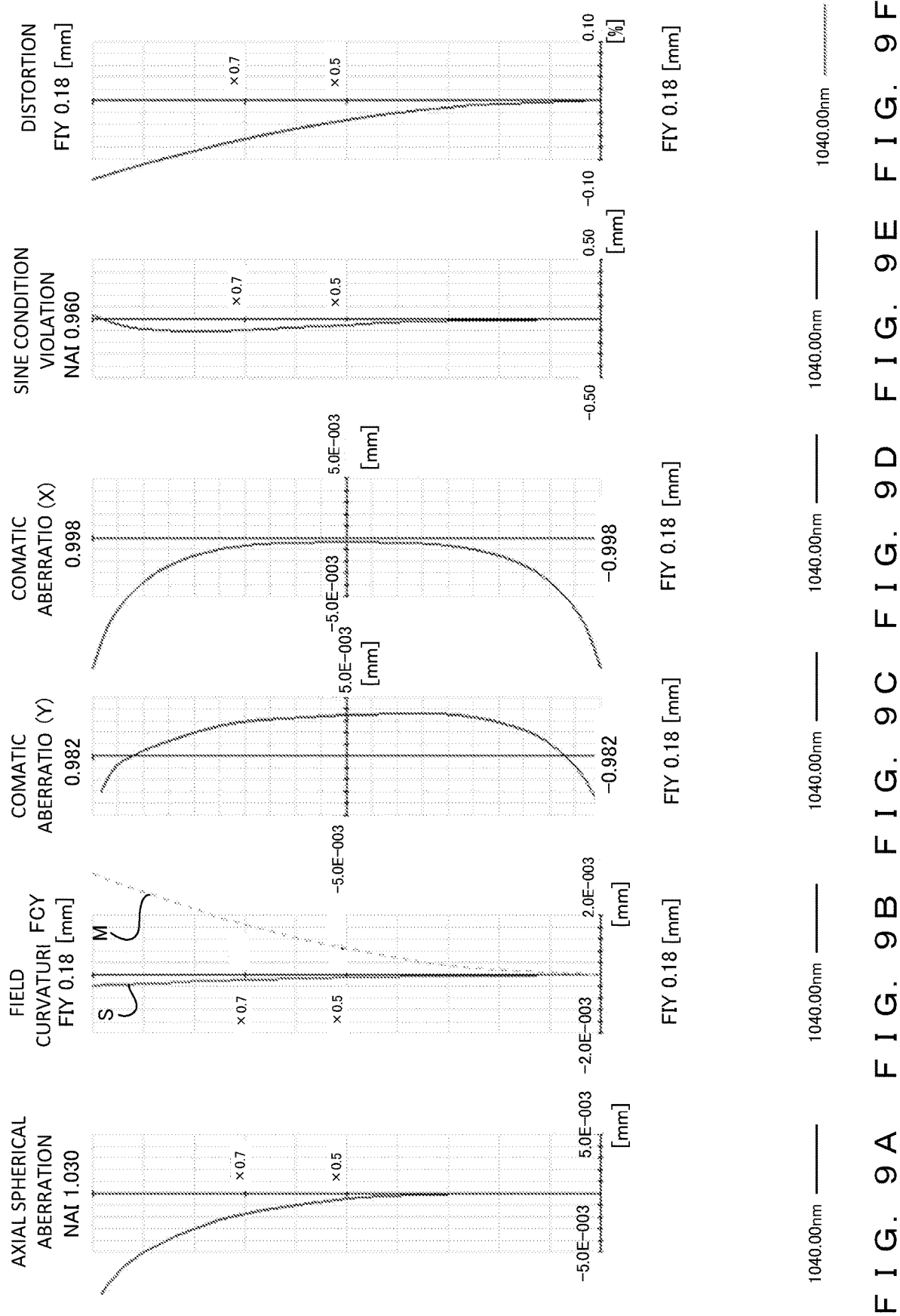
FIG. 9A to FIG. 9F are aberration diagrams of the optical system 10a at the time when light is collected at a position of 0.3 mm from a design position.

FIG. 7A to FIG. 9F are aberration diagrams of the optical system 10a. FIG. 7A to FIG. 7F, FIG. 8A to FIG. 8F, and FIG. 9A to FIG. 9F are respectively aberration diagrams at the time when a laser beam is collected at a position of −0.3 mm from the design position, at the design position, and at a position of 0.3 mm from the design position, and FIG. 7A to FIG. 7F, FIG. 8A to FIG. 8F, and FIG. 9A to FIG. 9F respectively illustrate aberrations in the states illustrated in FIG. 2, FIG. 3, and FIG. 4. FIG. 7A, FIG. 8A, and FIG. 9A are spherical aberration diagrams. FIG. 7B, FIG. 8B, and FIG. 9B are aberration diagrams relating to field curvature. FIG. 7C, FIG. 8C, and FIG. 9C are comatic aberration diagrams in a meridional direction at an image height of 0.18 mm. FIG. 7D, FIG. 8D, and FIG. 9D are comatic aberration diagrams in a sagittal direction at an image height of 0.18 mm. FIG. 7E, FIG. 8E, and FIG. 9E illustrate sine condition violation. FIG. 7F, FIG. 8F, and FIG. 9F are aberration diagrams relating to distortion. In the drawings, "M" indicates a meridional component and "S" indicates a sagittal component. "NA1" indicates a numerical aperture, and "FIY" indicates an image height. In this embodiment, an aberration is satisfactorily corrected regardless of the movement of a focus, as illustrated in FIG. 7A to FIG. 9F.

Second Embodiment

Figure 10:
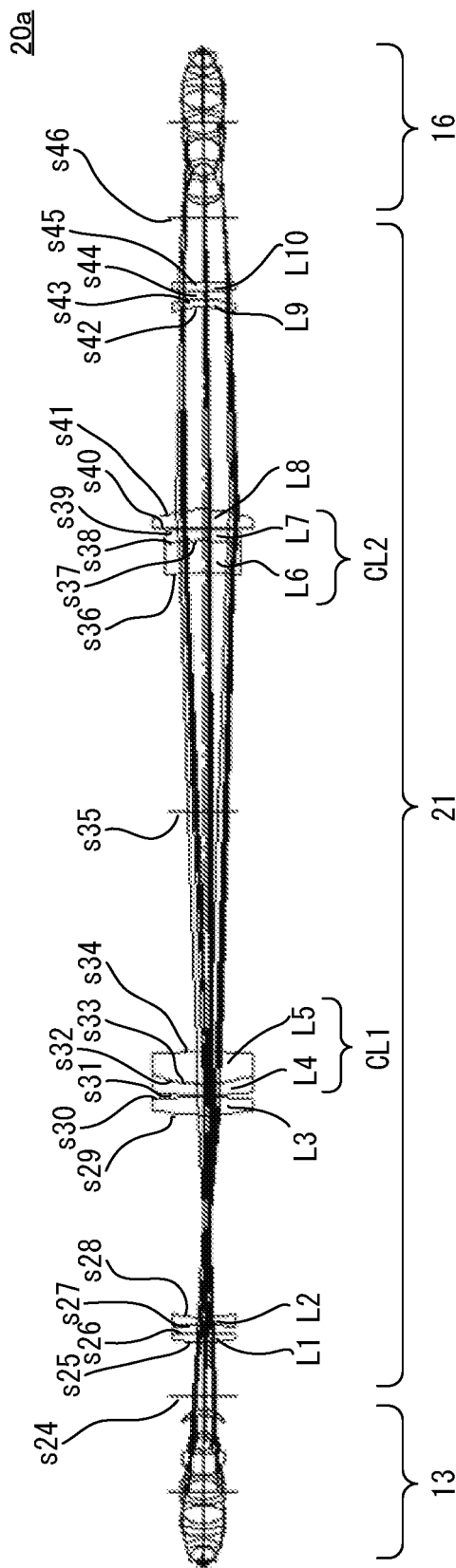
FIG. 10 is a sectional view of an optical system 20a according to a second embodiment illustrating a ray of light at the time when light is collected at a position of −0.3 mm from a design position.
Figure 11:
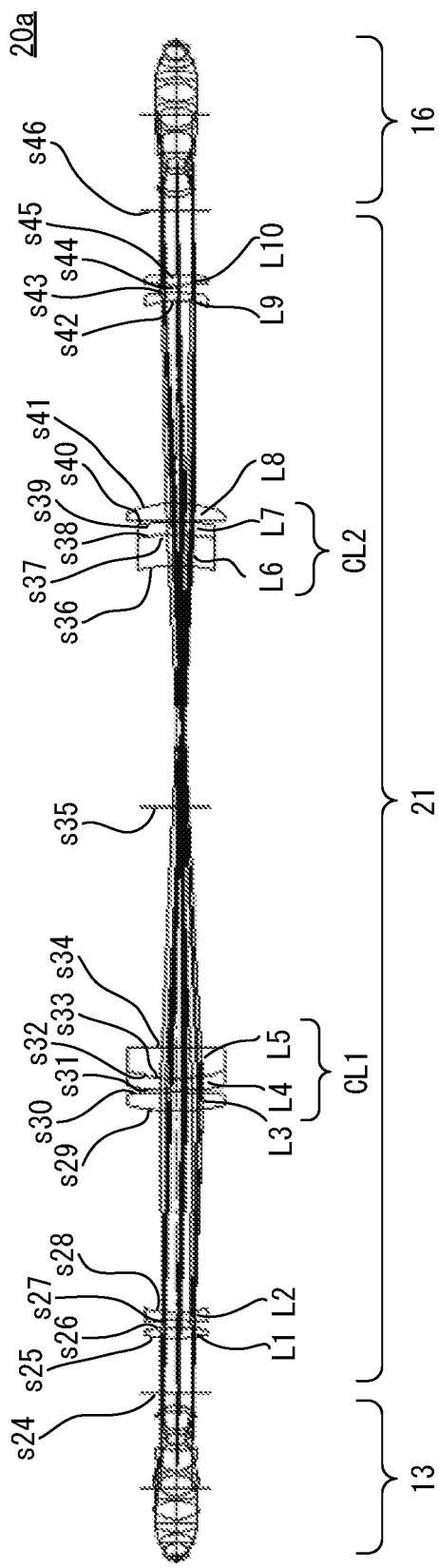
FIG. 11 is a sectional view of the optical system 20a according to the second embodiment illustrating a ray of light at the time when light is collected at a design position.
Figure 12:
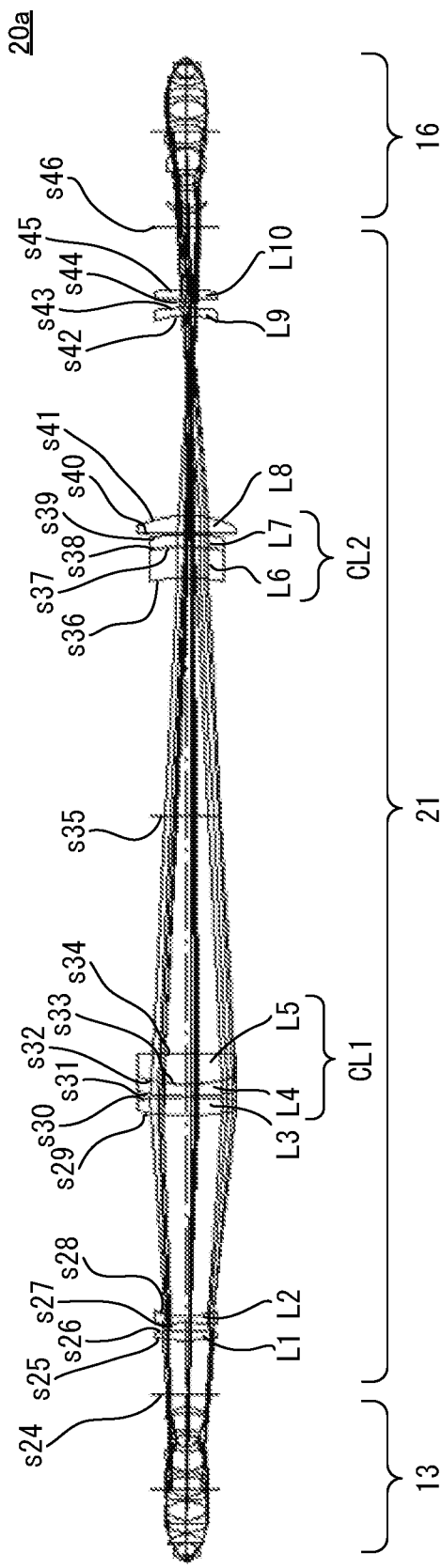
FIG. 12 is a sectional view of the optical system 20a according to the second embodiment illustrating a ray of light at the time when light is collected at a position of 0.3 mm from a design position.

An illumination device according to this embodiment is different from the illumination device 10 in that an optical system 20a is included instead of the optical system 10a. In the other respects, the illumination device according to this embodiment is similar to the illumination device 10. FIG. 10 to FIG. 12 are sectional views of the optical system 20a. The optical system 20a is different from the optical system 10a in that a relay optical system 21 is included instead of the relay optical system 14. In the other respects, the optical system 20a is similar to the optical system 10a. FIG. 10, FIG. 11, an FIG. 12 respectively illustrate rays of light at the time when light is collected at a position of −0.3 mm in the optical-axis direction from the design position, at the design position, and at a position of 0.3 mm in the optical-axis direction from the design position. The respective drawings also illustrate rays of light of three light fluxes that are collected on the axis, at the most out-of-axis position, and at an immediate image height position (an image height ratio of 0.5).

The relay optical system 21 is configured to correct an aberration that is generated in the objective 16 by the scanning device 12 moving the focusing position. In addition, the relay optical system 21 includes a lens surface having an aspherical shape in order to satisfactorily correct a spherical aberration. The relay optical system 21 and the objective 16 are configured to correct an aberration generated at the time when the focusing position is moved in the optical-axis direction by the scanning device 12 according to the compensation method.

In the illumination device according to this embodiment that has the configuration above, similarly to the illumination device 10, a focus can be moved at high speed according to the inner focus method while suppressing optical performance deterioration.

The relay optical system 21 includes, in order from the side of the laser 11, a biconvex lens L1, a biconcave lens L2, a biconvex lens L3, a cemented lens CL1, a cemented lens CL2, a meniscus lens L8 with a concave surface facing the side of the laser 11, a meniscus lens L9 with a concave surface facing the side of the laser 11, and a biconvex lens L10, as illustrated in FIG. 10 to FIG. 12. The cemented lens CL1 is configured by a meniscus lens L4 with a concave surface facing the side of the objective 16 and a biconvex lens L5. The cemented lens CL1 is a two-lens cemented lens that attains an overall biconvex shape by filling a gap between the meniscus lens L4 and the biconvex lens L5 with an adhesive. The cemented lens CL2 is configured by a meniscus lens L6 with a concave surface facing the side of the laser 11 and a meniscus lens L7 with a concave surface facing the side of the laser 11. The cemented lens CL2 is a two-lens cemented lens that attains an overall meniscus shape with a concave surface facing the side of the laser 11 by filling a gap between the meniscus lens L6 and the meniscus lens L7 with an adhesive. The biconvex lens L5 is an aspherical lens, and a lens surface on the side of the objective 16 is aspherical. The meniscus lens L6 is an aspherical lens, and a lens surface on the side of the laser 11 is aspherical.

The lens data of the optical system 20a is described below. The mark $ attached to a surface number indicates that a surface that corresponds to the surface number is aspherical. The lens data below indicates an example in which a cover glass CG1 is arranged on the side of the laser 11 of the lens 13, a cover glass CG2 is arranged on the side of the sample S of the objective 16, and portions before and after the cover glass CG1 and the cover glass CG2 are filled with a medium other than air.

Optical system 20a

| s | r | d | n1040 | vd |
|---|---|---|---|---|
| 1 | INF | D1 | 1.34855 | 57.71 |
| 2 | INF | 0.1700 | 1.51226 | 54.41 |
| 3 | INF | 1.7293 | 1.32576 | 55.60 |
| 4 | INF | 1.1500 | 1.44999 | 67.83 |
| 5 | −5.9903 | 5.7088 | 1.75484 | 49.60 |
| 6 | −6.8605 | 0.4770 | | |
| 7 | −36.5263 | 3.6000 | 1.56010 | 71.30 |
| 8 | −13.6341 | 1.1825 | | |
| 9 | 24.2042 | 4.0000 | 1.48987 | 81.14 |
| 10 | 126.6562 | 1.9000 | 1.65413 | 38.15 |
| 11 | 15.1716 | 9.0000 | 1.43328 | 94.93 |
| 12 | −17.8940 | 0.5919 | | |
| 13 | 43.9925 | 1.9000 | 1.65413 | 38.15 |
| 14 | 13.7154 | 9.6635 | 1.43327 | 94.97 |
| 15 | −12.6287 | 1.9000 | 1.72470 | 52.64 |
| 16 | −21.8800 | 0.2700 | | |
| 17 | 0.9415 | 10.0246 | 1.48987 | 81.14 |
| 18 | 35.2043 | 2.1621 | 1.72470 | 52.64 |
| 19 | 6.0773 | 5.7728 | | |
| 20 | −8.0008 | 2.2000 | 1.59791 | 44.27 |
| 21 | −15.3052 | 8.2967 | | |
| 22 | −18.6412 | 2.8000 | 1.65413 | 38.15 |
| 23 | −12.2826 | 6.3468 | | |
| 24 | INF | 25.7068 | | |
| 25 | 66.1470 | 4.7700 | 1.47883 | 70.23 |
| 26 | −169.4502 | 3.8700 | | |
| 27 | −173.9463 | 3.6000 | 1.47883 | 70.23 |
| 28 | 52.2924 | 96.8048 | | |
| 29 | 113.8974 | 8.7000 | 1.43328 | 94.93 |
| 30 | −323.0818 | 0.7500 | | |
| 31 | 137.4291 | 5.5500 | 1.72470 | 52.64 |
| 32 | 68.4825 | 0.0360 | 1.55050 | 43.79 |
| 33 | 68.4825 | 15.1200 | 1.43328 | 94.93 |
| 34$ | −601.1548 | 114.9186 | | |
| 35 | INF | 114.9186 | | |
| 36$ | −107.5946 | 15.1200 | 1.43328 | 94.93 |
| 37 | −98.5392 | 0.0360 | 1.55050 | 43.79 |
| 38 | −98.5392 | 5.5500 | 1.72470 | 52.64 |
| 39 | −222.5445 | 0.7500 | | |
| 40 | −4.910E+04 | 8.7000 | 1.43328 | 94.93 |
| 41 | −60.4406 | 96.8048 | | |
| 42 | −47.2068 | 3.6000 | 1.47883 | 70.23 |
| 43 | −80.0574 | 3.8700 | | |
| 44 | 125.7687 | 4.7700 | 1.47883 | 70.23 |
| 45 | −158.8255 | 30.8636 | | |
| 46 | INF | 6.3468 | | |
| 47 | 12.2826 | 2.8000 | 1.65413 | 38.15 |
| 48 | 18.6412 | 8.2967 | | |
| 49 | 15.3052 | 2.2000 | 1.59791 | 44.27 |
| 50 | 8.0008 | 5.7728 | | |
| 51 | −6.0773 | 2.1621 | 1.72470 | 52.64 |
| 52 | −35.2043 | 10.0246 | 1.48987 | 81.14 |
| 53 | −10.9415 | 0.2700 | | |
| 54 | 21.8800 | 1.9000 | 1.72470 | 52.64 |
| 55 | 12.6287 | 9.6635 | 1.43327 | 94.97 |
| 56 | −13.7154 | 1.9000 | 1.65413 | 38.15 |
| 57 | −43.9925 | 0.5919 | | |
| 58 | 17.8940 | 9.0000 | 1.43328 | 94.93 |
| 59 | −15.1716 | 1.9000 | 1.65413 | 38.15 |
| 60 | −126.6562 | 4.0000 | 1.48987 | 81.14 |
| 61 | −24.2042 | 1.1825 | | |
| 62 | 13.6341 | 3.6000 | 1.56010 | 71.30 |
| 63 | 36.5263 | 0.4770 | | |
| 64 | 6.8605 | 5.7088 | 1.75484 | 49.60 |
| 65 | 5.9903 | 1.1500 | 1.44999 | 67.83 |
| 66 | INF | 1.7293 | 1.32576 | 55.60 |
| 67 | INF | 0.1700 | 1.51226 | 54.41 |
| 68 | INF | D68 | 1.34855 | 57.71 |
| 69 | INF | 0.0000 | 1.34855 | 57.71 |

The aspherical data of the relay optical system 21 is described below. Here, an aspherical shape is expressed according to the equation below. In this equation, Z is a coordinate in a direction of the optical axis of an aspherical surface, Y is a coordinate in a direction orthogonal to the optical axis of the aspherical surface, K is a conic constant, r is a radius of curvature in a paraxial state of the aspherical surface, and AC2, AC4, AC6, AC8, and AC10 are respectively second-order, fourth-order, sixth-order, eighth-order, and tenth-order aspherical coefficients. E indicates the power of $$Z = \frac{Y^2}{r + r\sqrt{1-(K+1)(Y/r)^2}} + AC2Y^2 + AC4Y^4 + AC6Y^6 + AC8Y^8 + AC10Y^{10}$$

34th surface S34
  K=−1.0000, AC2=0.0000E+00, AC4=1.1581E-07
  AC6=3.5293E-10, AC8=−3.2466E-12, AC10=4.4282E-15
36th Surface S36
  K=−1.0000, AC2=0.0000E+00, AC4=−9.3000E-07
  AC6=2.6036E-09, AC8=7.9816E-12, AC10=−3.0799E-14

The values of D1 and D68 in the state (Zoom1) illustrated in FIG. 10 in which the focusing position is located at a position of −0.3 mm from the design position, in the state (Zoom2) illustrated in FIG. 11 in which the focusing position is located at the design position, and in the state (Zoom3) illustrated in FIG. 12 in which the focusing position is located in a position of 0.3 mm from the design position are described below.

|  | Zoom1 | Zoom2 | Zoom3 |
|---|---|---|---|
| D1 | 0.59371 | 0.30000 | −0.00643 |
| D68 | 0.0 | 0.30000 | 0.60000 |

Figures 15A, 15B, 15C, 15D, 15E, 15F:
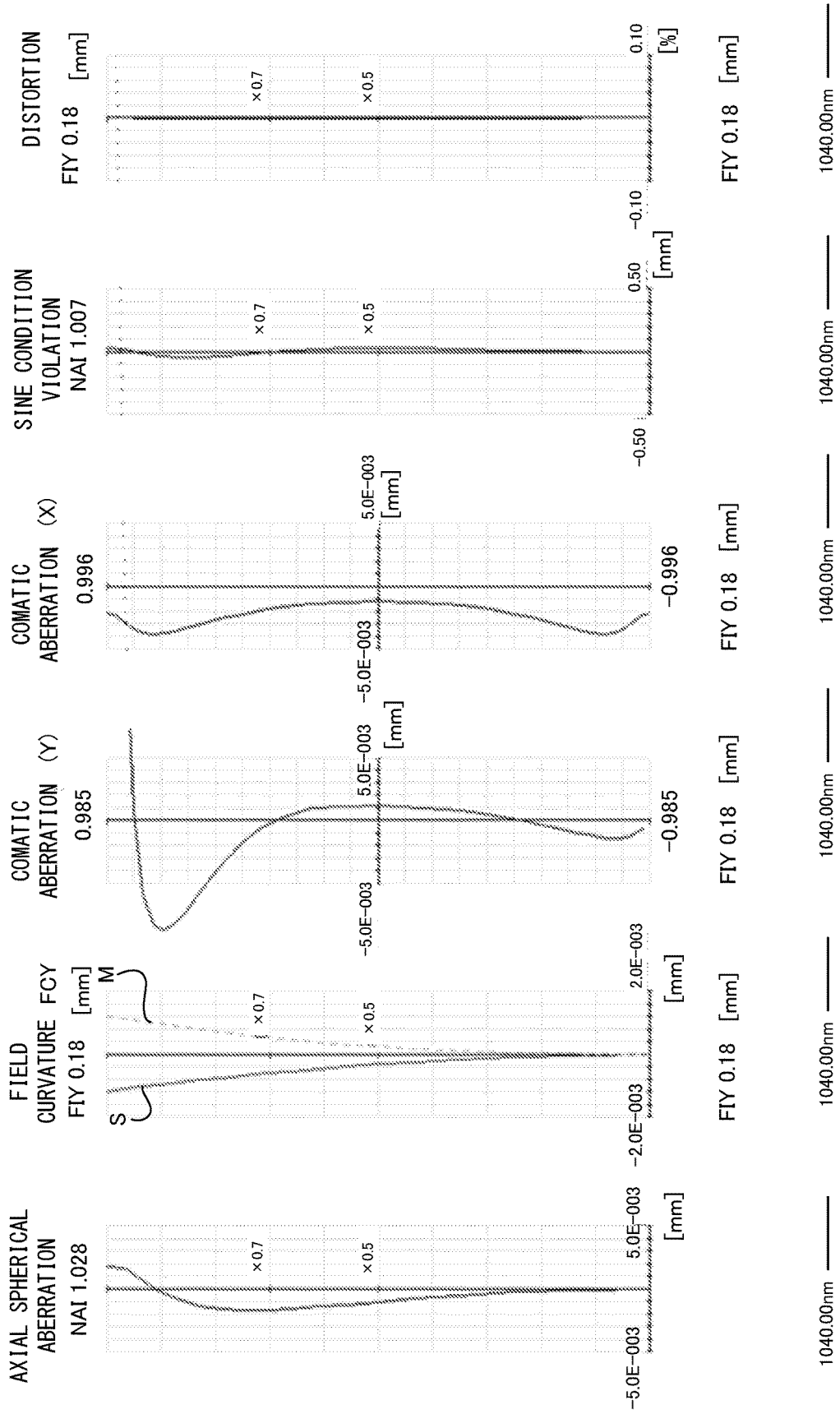
FIG. 15A to FIG. 15F are aberration diagrams of the optical system 20a at the time when light is collected at a position of 0.3 mm from a design position.

FIG. 13A to FIG. 15F are aberration diagrams of the optical system 20a. FIG. 13A to FIG. 13F, FIG. 14A to FIG. 14F, and FIG. 15A to FIG. 15F are respectively aberration diagrams at the time when a laser beam is collected at a position of −0.3 mm from the design position, at the design position, and at a position of 0.3 mm from the design position, and FIG. 13A to FIG. 13F, FIG. 14A to FIG. 14F, and FIG. 15A to FIG. 15F respectively illustrate aberrations in the state illustrated in FIG. 10, FIG. 11, and FIG. 12. FIG. 13A, FIG. 14A, and FIG. 15A are spherical aberration diagrams. FIG. 13B, FIG. 14B, and FIG. 15B are aberration diagrams relating to field curvature. FIG. 13C, FIG. 14C, and FIG. 15C are comatic aberration diagrams in a meridional direction at an image height of 0.18 mm. FIG. 13D, FIG. 14D, and FIG. 15D are comatic aberration diagrams in a sagittal direction at an image height of 0.18 mm. FIG. 13E, FIG. 14E, and FIG. 15E illustrate sine condition violation. FIG. 13F, FIG. 14F, and FIG. 15F are aberration diagrams relating to distortion. In this embodiment, similarly, an aberration is satisfactorily corrected regardless of the movement of a focus, as illustrated in FIG. 13A to FIG. 15F.

Third Embodiment

FIG. 16 illustrates the configuration of an illumination device 30 according to this embodiment. The illumination device 30 is different from the illumination device 10 in that a varifocal lens 31 is included instead of the scanning device 12 and the lens 13.

The varifocal lens 31 is a scanning device that moves the focusing position of a laser beam with which the objective 16 irradiates the sample S in an optical-axis direction of the objective 16, and the varifocal lens 31 is, for example, an electric tunable lens (ETL). The varifocal lens 31 can move the focusing position of the laser beam in the optical-axis direction of the objective 16 according to the inner focus method by changing the shape (curvature) of the lens according to a control signal from the controller 18.

In the illumination device 30, similarly to the illumination device 10, a focus can be moved at high speed according to the inner focus method while suppressing optical performance deterioration. In addition, the varifocal lens 31 can change the shape of a lens at high speed. Therefore, in the illumination device 30, a focus can be moved at a higher speed than the speed of the illumination device 10.

Fourth Embodiment

FIG. 17 illustrates the configuration of an illumination device 40 according to this embodiment. The illumination device 40 is different from the illumination device 10 in that a polarization beam splitter (PBS) 41, a λ/4 plate 42, an objective 43, and a mirror 44 are included instead of the scanning device 12 and the lens 13 on an optical path between the laser 11 and the relay optical system 14. The illumination device 40 is also different from the illumination device 10 in that a relay optical system 45 is included between the relay optical system 14 and the mirror 15.

In the illumination device 40, a laser beam emitted from the laser 11 passes through the PBS 41 and the λ/4 plate 42, and is applied to the mirror 44 by the objective 43. The mirror 44 is arranged near a focal plane of the objective 43 in such a way that a reflection surface is orthogonal to the optical axis of the objective 43. The laser beam reflected by the mirror 44 passes through the objective 43 and the λ/4 plate 42, and enters the PBS 41. The polarization direction of a laser beam that has entered the PBS 41 from a side of the λ/4 plate 42 differs by 90 degrees from the polarization direction of a laser beam that has entered the PBS 41 from a side of the laser 11, and therefore the laser beam that has entered the PBS 41 from the side of the λ/4 plate 42 is reflected by the PBS 41, and is guided to the relay optical system 14. The laser beam passes through the relay optical system 14, and enters the relay optical system 45. In the relay optical system 45, the diameter of a light flux of the laser beam is adjusted to a size according to the pupil diameter of the objective 16. The laser beam for which the diameter of the light flux has been adjusted is reflected by the mirror 15, and is applied to the sample S by the objective 16.

In the illumination device 40, the mirror 44, which moves in an optical-axis direction of the objective 43, is a scanning device that moves the focusing position of a laser beam that the objective 16 applies to the sample S in an optical-axis direction of the objective 16. The mirror 44 moves in the optical-axis direction of the objective 43 in accordance with a control signal from the controller 18 such that the focusing position of the laser beam can be moved in the optical-axis direction of the objective 16 according to the inner focus method.

In the illumination device 40, similarly to the illumination device 10, a focus can be moved at high speed according to the inner focus method while suppressing optical performance deterioration. In addition, the mirror 44, which is arranged near the focal plane of the objective 43, is smaller and lighter than the lens 13, and can move at high speed. Therefore, in the illumination device 40, a focus can be moved at a higher speed than the speed of the illumination device 10. The relay optical system 45 can be omitted.

Fifth Embodiment

FIG. 18 illustrates the configuration of an illumination device 50 according to this embodiment. The illumination device 50 is different from the illumination device 10 in that a beam expander 51 and a scanning device 52 are included on an optical path between the laser 11 and the scanning device 12.

The beam expander 51 adjusts the diameter of a light flux of a laser beam that enters the scanning device 52. The beam expander 51 may be arranged in such a way that some lenses of the beam expander 51 can move in an optical-axis direction. In this case, the beam expander 51 functions as an offset device, similarly to the objective 16 and the stage 17.

The scanning device 52 includes a scanner 52a and a scanner 52b. The scanning device 52 is a scanning device that moves the focusing position of a laser beam that the objective 16 applies to the sample S in a direction orthogonal to the optical axis of the objective 16, and the scanning device 52 controls the operations of the scanner 52a and the scanner 52b in accordance with a control signal from the controller 18. The scanner 52a and the scanner 52b are scanners that move the focusing position in directions different from each other, and are, for example, galvanometer mirrors, resonant scanners, or the like. The scanning device 52 may be arranged in any position that is closer to the laser 11 than the relay optical system 14.

In the illumination device 50, similarly to the illumination device 10, a focus can be moved at high speed according to the inner focus method while suppressing optical performance deterioration. In addition, in the illumination device 50, the controller 18 controls the operation of the scanning device 52 such that the focusing position can also be moved in a direction orthogonal to an optical axis in addition to the optical-axis direction. Accordingly, by employing the illumination device 50 in a microscope device or the like, the sample S can be scanned three-dimensionally.

Sixth Embodiment

FIG. 19 illustrates the configuration of an illumination device 60 according to this embodiment. The illumination device 60 is different from the illumination device 10 in that a plurality of objectives (an objective 16 and an objective 66) and a plurality of relay optical systems (a relay optical system 14 and a relay optical system 63) are included. The illumination device 60 is also different from the illumination device 10 in that a revolver 65 that switches the plurality of objectives is included.

The revolver 65 is an objective switching device that selectively arranges one objective of the plurality of objectives on an optical path. The revolver 65 may be configured to switch objectives according to a control signal from the controller 18.

The plurality of relay optical systems are configured to correct aberrations generated in objectives that are different from each other. The relay optical system 63 is configured to correct an aberration generated in the objective 66 by the scanning device 12 moving the focusing position. The relay optical system 63 and the objective 66 are configured to correct an aberration that is generated when the scanning device 12 moves the focusing position in the optical-axis direction according to the compensation method.

In the illumination device 60, when the objective 16 is arranged on the optical path, a mirror 61 is removed from the optical path. By doing this, a laser beam is guided to the relay optical system 14, and is also guided to the objective 16 via the mirror 15. When the objective 66 is arranged on the optical path, the mirror 61 is inserted into the optical path, and the mirror 15 is removed from the optical path. By doing this, a laser beam is guided to the relay optical system 63 via the mirror 61 and a mirror 62, and is also guided to the objective 66 via a mirror 64. As described above, in the illumination device 60, the mirror 61 and the mirror 15 function as an optical-path switching device that guides light to a relay optical system that corresponds to an objective.

In the illumination device 60, similarly to the illumination device 10, a focus can be moved at high speed according to the inner focus method while suppressing optical performance deterioration. In addition, in the illumination device 60, by providing a relay optical system for each objective, even when an objective is selectively used, a focus can be moved at high speed while suppressing optical performance deterioration.

Seventh Embodiment

Figure 20:
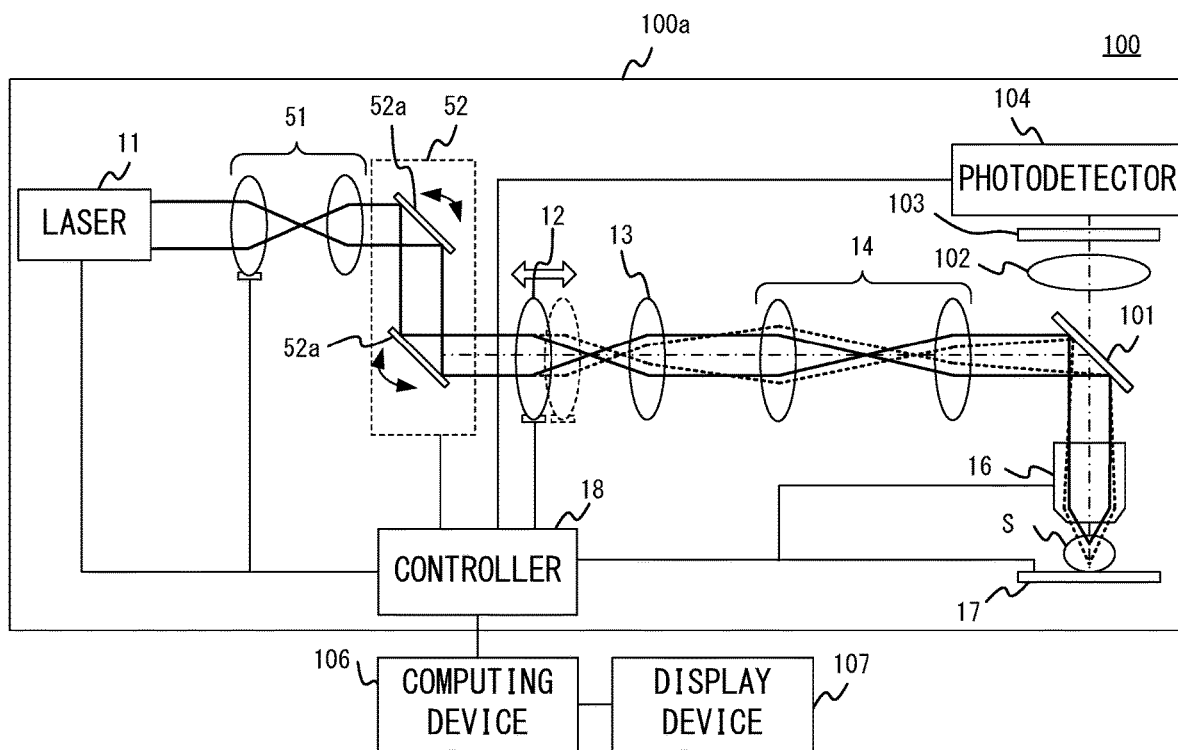
FIG. 20 illustrates the configuration of a two-photon excitation microscope 100 according to a seventh embodiment.

FIG. 20 illustrates the configuration of a two-photon excitation microscope 100 according to this embodiment. The two-photon excitation microscope 100 is a microscope device that includes an illumination device that moves a focus according to the inner focus method. The two-photon excitation microscope 100 includes a microscope body 100a, a computing device 106, and a display device 107, as illustrated in FIG. 20.

The microscope body 100a includes an illumination device that is similar to the illumination device 50. The illumination device included in the microscope body 100a is different from the illumination device 50 in that a dichroic mirror 101 is included instead of the mirror 15. The dichroic mirror 101 has a characteristic wherein a laser beam is reflected and fluorescence is transmitted. An ultra-short pulse laser is used, for example, as the laser 11.

The microscope body 100a further includes a lens 102, a barrier filter 103, and a photodetector 104. The lens 102 is a projection lens that projects the pupil of the objective 16 near the photodetector 104. The barrier filter 103 is an optical filter that shields a laser beam and transmits fluorescence. The photodetector 104 is, for example, a photomultiplier tube.

In the two-photon excitation microscope 100, a fluorescent material is excited at a focusing position of a laser beam that has been applied to the sample S, and fluorescence is generated. The fluorescence that has been generated at the focusing position is collected by the objective 16, and is guided to the dichroic mirror 101. The fluorescence that has entered the dichroic mirror 101 passes through the dichroic mirror 101, and enters the photodetector 104 via the lens 102 and the barrier filter 103. By doing this, the fluorescence that has been generated at the focusing position is detected by the photodetector 104, and is converted into an electric signal.

The controller 18 generates two-dimensional image data on the basis of signals from the photodetector 104 and the scanning device 52, and outputs the two-dimensional image data to the computing device 106. The computing device 106 is, for example, a standard computer. The computing device 106 generates three-dimensional image data on the basis of plural pieces of two-dimensional image data obtained from the controller 18. The display device 107 is, for example, a liquid crystal display, an organic electroluminescence (EL) display, or the like. The display device 107 displays a two-dimensional image or a three-dimensional image of the sample S in accordance with an image signal from the computing device 106.

In the two-photon excitation microscope 100, similarly to the illumination device 10, a focus can be moved at high speed according to the inner focus method while suppressing optical performance deterioration. Therefore, a two-photon excitation phenomenon that requires a high photon density can be generated at an arbitrary focusing position, and the sample S can be scanned three-dimensionally. In addition, a vital reaction that disappears in a short time (for example, on the order of milliseconds) can be captured with a high resolving power. Accordingly, the two-photon excitation microscope 100 is suitable for the observation of biotissues.

Eighth Embodiment

Figure 21:
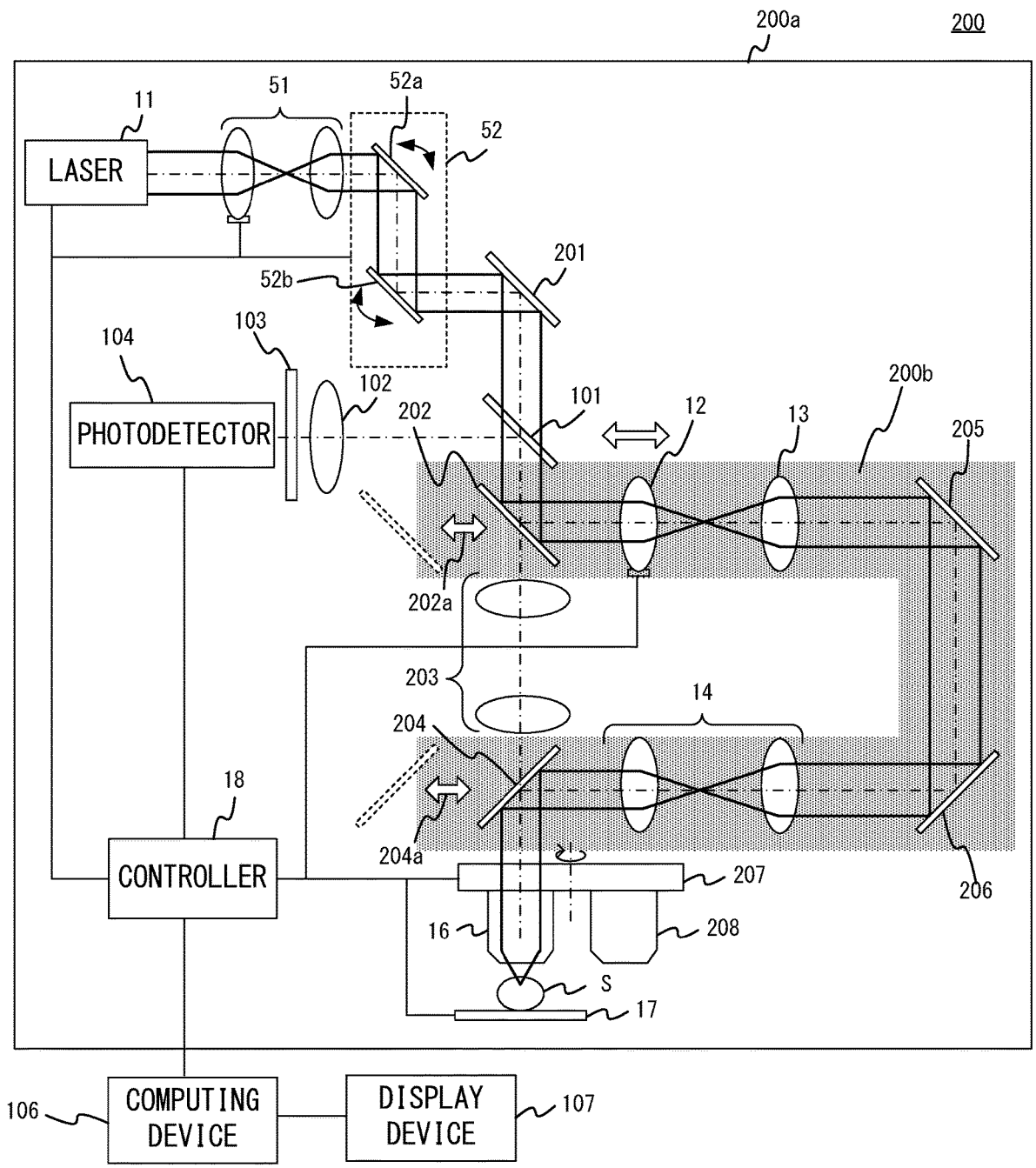
FIG. 21 illustrates the configuration of a two-photon excitation microscope 200 according to an eighth embodiment.

FIG. 21 illustrates the configuration of a two-photon excitation microscope 200 according to this embodiment. The two-photon excitation microscope 200 is a microscope device that includes an illumination device that moves a focus according to the inner focus method similarly to the two-photon excitation microscope 100. The two-photon excitation microscope 200 is different from the two-photon excitation microscope 100 in that a microscope body 200a is included instead of the microscope body 100a.

The microscope body 200a is obtained by adding a configuration 200b (a hatched portion in FIG. 21) for inner focusing to a general configuration of a two-photon excitation microscope. A dichroic mirror 202 and a dichroic mirror 204 are included in the configuration 200b. The dichroic mirror 202 serving as a first optical element and the dichroic mirror 204 serving as a second optical element have an optical characteristic wherein a laser beam is reflected and fluorescence is transmitted. The dichroic mirror 202 and the dichroic mirror 204 form a first optical path that a laser beam passes through and a second optical path that fluorescence passes through between the objective 16 and the photodetector 104. The first optical path is an optical path that a laser beam that has been reflected by the dichroic mirror 202 passes through, and the relay optical system 14 is arranged on the first optical path. The second optical path is an optical path for which the length is shorter than that of the first optical path, and is an optical path that fluorescence that has passed through the dichroic mirror 204 passes through. It is preferable that the configuration 200b include an insertion/removal device 202a and an insertion/removal device 204a, such as turrets, that insert or remove the dichroic mirror 202 and the dichroic mirror 204 into/from an optical path between an objective and the photodetector 104.

In the two-photon excitation microscope 200, when the objective 16 is arranged on the optical path, the dichroic mirror 202 and the dichroic mirror 204 are inserted into the optical path. By doing this, a laser beam that has passed through the dichroic mirror 101 is guided via the dichroic mirror 202 to the scanning device 12, the lens 13, a mirror 205, a mirror 206, and the relay optical system 14, and is further guided via the dichroic mirror 204 to the objective 16. Fluorescence generated from the sample S passes through the dichroic mirror 204, and enters a relay optical system 203. The fluorescence that has passed through the dichroic mirror 202 is reflected by the dichroic mirror 101, passes through the lens 102 and the barrier filter 103, and is detected by the photodetector 104.

When a revolver 207 is rotated and an objective 208 is arranged on the optical path, the dichroic mirror 202 and the dichroic mirror 204 are removed from the optical path. By doing this, a laser beam that has passed through the dichroic mirror 101 is guided to the objective 208 via the relay optical system 203. In addition, fluorescence generated from the sample S enters the relay optical system 203 via the objective 208. The fluorescence is reflected by the dichroic mirror 101, passes through the lens 102 and the barrier filter 103, and is detected by the photodetector 104.

In the two-photon excitation microscope 200, when the objective 16 is used, a focus can be moved at high speed according to the inner focus method while suppressing optical performance deterioration, similarly to the two-photon excitation microscope 100. Further, the length of an optical path from the sample S to the photodetector 104 through which fluorescence passes can be reduced in comparison with a case in which the two-photon excitation microscope 100 is employed. Therefore, fluorescence can be detected with a higher detection efficiency than that of the two-photon excitation microscope 100. Furthermore, when an objective other than the objective 16 is used, the two-photon excitation microscope 200 can be used in a general configuration.

In this embodiment, an example has been described in which the dichroic mirror 202 and the dichroic mirror 204 are removed from an optical path in a case in which the objective 16 that corresponds to the relay optical system 14 is not used, but the dichroic mirror 202 and the dichroic mirror 204 may be removed in a case in which the objective 16 is used. As an example, in a case in which the high-speed movement of a focus is considered more important, the dichroic mirror 202 and the dichroic mirror 204 may be inserted into the optical path, and in a case in which the intensity of illumination is considered more important, the dichroic mirror 202 and the dichroic mirror 204 may be removed from the optical path.

Ninth Embodiment

FIG. 22 illustrates the configuration of a laser scanning confocal microscope 300 according to this embodiment. The laser scanning confocal microscope 300 is a microscope device that includes an illumination device that moves a focus according to the inner focus method. The laser scanning confocal microscope 300 includes a microscope body 300a, a computing device 106, and a display device 107, as illustrated in FIG. 22.

The microscope body 300a includes an illumination device that is similar to the illumination device 50. The illumination device included in the microscope body 300a is different from the illumination device 50 in that a dichroic mirror 101 is included between the beam expander 51 and the scanning device 52. The dichroic mirror 101 has a characteristic wherein a laser beam is transmitted and fluorescence is reflected. A visible laser is used, for example, as the laser 11.

The microscope body 300a further includes a lens 301, a confocal diaphragm 302, a barrier filter 303, and a photodetector 304. The confocal diaphragm 302 is arranged in such a way that a pinhole is located at a focal position of the lens 301. The barrier filter 303 is an optical filter that shields a laser beam and transmits fluorescence. The photodetector 304 is, for example, a photomultiplier tube.

In the laser scanning confocal microscope 300, a fluorescent material is excited at the focusing position of a laser beam that has been applied to the sample S, and fluorescence is generated. The fluorescence that has been generated from the sample S travels in an opposite direction through the sample optical path as that of the laser beam, and is reflected by the dichroic mirror 101. Fluorescence that has been generated at a position other than the focusing position within the sample S is shielded by the confocal diaphragm 302. In contrast, fluorescence that has been generated at the focusing position is collected on the pinhole of the confocal diaphragm 302 by the lens 301, passes through the barrier filter 303, and is detected by the photodetector 304.

The controller 18 generates two-dimensional image data on the basis of signals from the photodetector 304 and the scanning device 52, and outputs the two-dimensional image data to the computing device 106. The computing device 106 generates three-dimensional image data on the basis of plural pieces of two-dimensional image data obtained from the controller 18. The display device 107 displays a two-dimensional image or a three-dimensional image of the sample S in accordance with an image signal from the computing device 106.

In the laser scanning confocal microscope 300, similarly, a focus can be moved at high speed according to the inner focus method while suppressing optical performance deterioration. Therefore, the sample S can be scanned three-dimensionally, and a three-dimensional image can be constructed.

Tenth Embodiment

Figure 23:
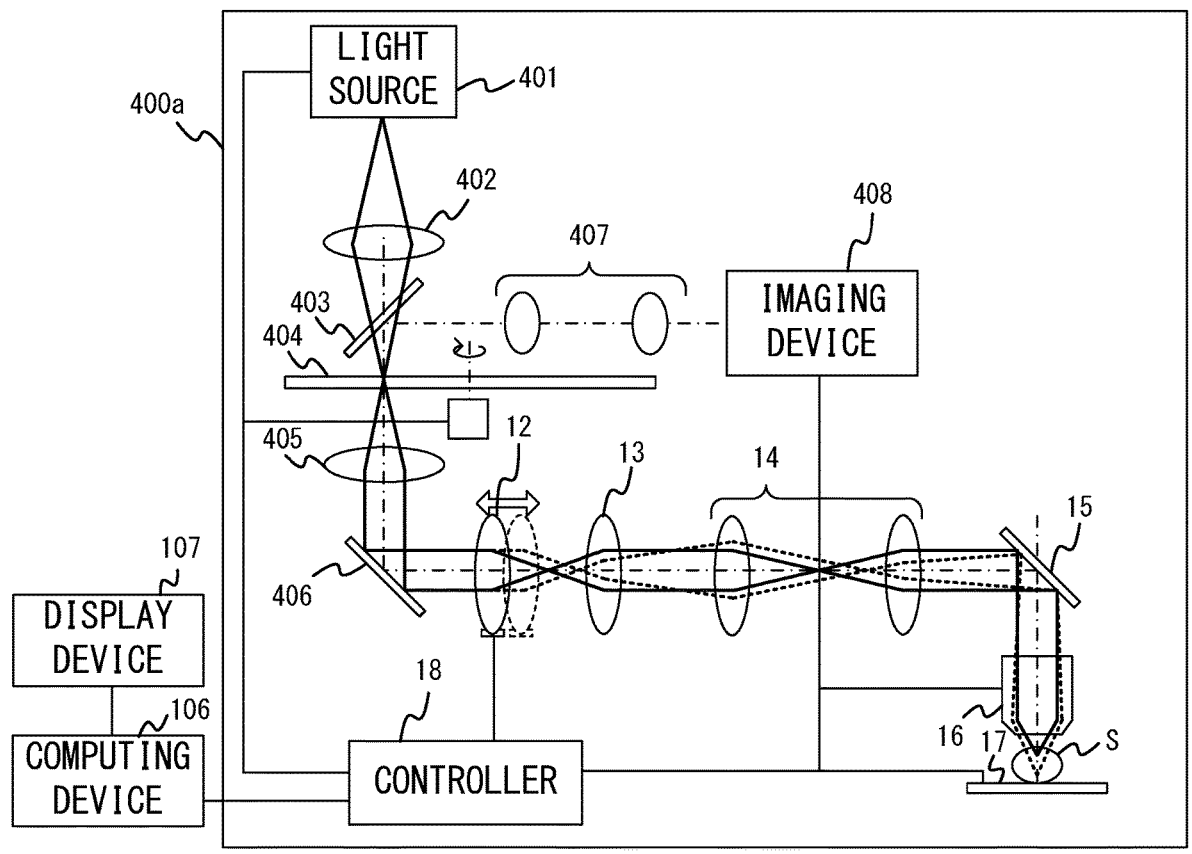
FIG. 23 illustrates the configuration of a disk scanning confocal microscope 400 according to a tenth embodiment.

FIG. 23 illustrates the configuration of a disk scanning confocal microscope 400 according to this embodiment. The disk scanning confocal microscope 400, which is one type of a confocal microscope, is a microscope device that includes an illumination device that moves a focus according to the inner focus method. The disk scanning confocal microscope 400 includes a microscope body 400a, a computing device 106, and a display device 107, as illustrated in FIG. 23.

The illumination device of the microscope body 400a includes a scanning device 12, a lens 13, a relay optical system 14, a mirror 15, and an objective 16 similarly to the illumination device 10. The illumination device of the microscope body 400a further includes a light source 401, a lens 402, a dichroic mirror 403, a confocal disk 404, a tube lens 405, and a mirror 406. The light source 401 is, for example, a xenon lamp or the like. The lens 402 collects light from the light source 401 on the confocal disk 404. The confocal disk 404 is a rotary disk in which a slit or a pinhole is formed. The microscope body 400a further includes a relay optical system 407 and an imaging device 408. The imaging device 408 is, for example, a charge coupled device (CCD) camera. In the disk scanning confocal microscope 400, the confocal disk 404 serves as the confocal diaphragm 302 and the scanning device 52 in the laser scanning confocal microscope 300.

The controller 18 generates three-dimensional image data on the basis of plural pieces of two-dimensional image data obtained from the imaging device 408. The display device 107 displays a two-dimensional image or a three-dimensional image of the sample S in accordance with an image signal from the computing device 106.

In the disk scanning confocal microscope 400, similarly, a focus can be moved at high speed according to the inner focus method while suppressing optical performance deterioration. Therefore, the sample S can be scanned three-dimensionally, and a three-dimensional image can be constructed.

The embodiments described above give specific examples in order to make the invention easily understandable, and embodiments of the present invention are not limited to the embodiments described above. Various modifications or variations can be made to the illumination device and the microscope device without departing from the recitation of the claims.

As an example, an arbitrary illumination device of the illumination devices described in the first embodiment to the sixth embodiment may be employed in a two-photon excitation microscope, or may be employed in a multi-photon excitation microscope other than the two-photon excitation microscope. In addition, the first optical element and the second optical element may have an optical characteristic wherein a laser beam is transmitted and fluorescence is reflected, if an optical path of the fluorescence is reduced.

What is claimed is:

1. An illumination device comprising:
   an objective that applies light from a light source to a sample;
   a first scanning device that moves a focusing position of the light that the objective applies to the sample in an optical-axis direction of the objective; and
   a relay optical system that is configured to correct an aberration that is generated in the objective by the first scanning device moving the focusing position, by generating an aberration in a direction opposite to a direction of the aberration that is generated in the objective in such a way that the aberration generated in the objective is corrected on the sample, the relay optical system being arranged on an optical path between the first scanning device and the objective.

2. The illumination device according to claim 1, further comprising:
   an offset device that offsets a movement of the focusing position due to switching of a wavelength of the light.

3. The illumination device according to claim 2, further comprising:
   a controller that controls the offset device according to the wavelength of the light.

4. The illumination device according to claim 3, wherein the relay optical system includes a lens surface having an aspherical shape.

5. The illumination device according to claim 3, further comprising:
   an objective switching device that selectively arranges one objective of a plurality of objectives including the objective on an optical path of the light;
   a plurality of relay optical systems that are configured to correct aberrations generated in respective different objectives, the plurality of relay optical systems including the relay optical system; and
   an optical-path switching device that guides the light to a relay optical system that corresponds to an objective that the objective switching device has arranged on the optical path of the light.

6. The illumination device according to claim 4, further comprising:
   an objective switching device that selectively arranges one objective of a plurality of objectives including the objective on an optical path of the light;
   a plurality of relay optical systems that are configured to correct aberrations generated in respective different objectives, the plurality of relay optical systems including the relay optical system; and
   an optical-path switching device that guides the light to a relay optical system that corresponds to an objective that the objective switching device has arranged on the optical path of the light.

7. The illumination device according to claim 2, wherein the relay optical system includes a lens surface having an aspherical shape.

8. The illumination device according to claim 7, further comprising:
   an objective switching device that selectively arranges one objective of a plurality of objectives including the objective on an optical path of the light;
   a plurality of relay optical systems that are configured to correct aberrations generated in respective different objectives, the plurality of relay optical systems including the relay optical system; and
   an optical-path switching device that guides the light to a relay optical system that corresponds to an objective that the objective switching device has arranged on the optical path of the light.

9. The illumination device according to claim 2, further comprising:
   an objective switching device that selectively arranges one objective of a plurality of objectives including the objective on an optical path of the light;
   a plurality of relay optical systems that are configured to correct aberrations generated in respective different objectives, the plurality of relay optical systems including the relay optical system; and
   an optical-path switching device that guides the light to a relay optical system that corresponds to an objective that the objective switching device has arranged on the optical path of the light.

10. The illumination device according to claim 1, wherein the relay optical system includes a lens surface having an aspherical shape.

11. The illumination device according to claim 10, further comprising:
   an objective switching device that selectively arranges one objective of a plurality of objectives including the objective on an optical path of the light;
   a plurality of relay optical systems that are configured to correct aberrations generated in respective different objectives, the plurality of relay optical systems including the relay optical system; and
   an optical-path switching device that guides the light to a relay optical system that corresponds to an objective that the objective switching device has arranged on the optical path of the light.

12. The illumination device according to claim 1, further comprising:
   an objective switching device that selectively arranges one objective of a plurality of objectives including the objective on an optical path of the light;
   a plurality of relay optical systems that are configured to correct aberrations generated in respective different objectives, the plurality of relay optical systems including the relay optical system; and
   an optical-path switching device that guides the light to a relay optical system that corresponds to an objective that the objective switching device has arranged on the optical path of the light.

13. A microscope device comprising:
   the illumination device according to claim 1.

14. The microscope device according to claim 13, wherein the illumination device further includes a second scanning device that moves the focusing position in a direction that is orthogonal to the optical-axis direction of the objective, the second scanning device being arranged between the light source and the relay optical system.

15. The microscope device according to claim 14, further comprising:
   a photodetector that detects fluorescence generated at the focusing position,
   wherein the illumination device includes the light source including an ultra-short pulse laser, and
   wherein the microscope device comprises a two-photon excitation microscope.

16. The microscope device according to claim 15, further comprising:
   a first optical element and a second optical element that have an optical characteristic wherein one of the light and the fluorescence is reflected and another is transmitted,
   wherein the first optical element and the second optical element form a first optical path that the light passes through and a second optical path that the fluorescence passes through between the objective and the photodetector, a length of the second optical path being shorter than that of the first optical path, and
   wherein the relay optical system is arranged on the first optical path.

17. The microscope device according to claim 16, further comprising:
   an insertion/removal device that inserts or removes the first optical element and the second optical element into/from an optical path between the objective and the photodetector.

18. The microscope device according to claim 14, wherein the microscope device comprises a confocal microscope.

19. The microscope device according to claim 18, wherein the microscope device comprises a disk scanning microscope.

* * * * *